(12) United States Patent
Norikane et al.

(10) Patent No.: US 8,821,006 B2
(45) Date of Patent: Sep. 2, 2014

(54) MICROSCOPIC FLOW PASSAGE STRUCTURE, MICROSCOPIC LIQUID DROPLET GENERATING METHOD, MICROSCOPIC LIQUID DROPLET GENERATING SYSTEM, PARTICLES, AND MICROCAPSULES

(75) Inventors: Yoshihiro Norikane, Kanagawa (JP); Shinji Tezuka, Kanagawa (JP); Masaru Ohgaki, Kanagawa (JP); Masahiro Masuzawa, Kanagawa (JP); Hideyuki Miyazawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1886 days.

(21) Appl. No.: 11/652,083

(22) Filed: Jan. 11, 2007

(65) Prior Publication Data

US 2007/0242560 A1  Oct. 18, 2007

(30) Foreign Application Priority Data

Jan. 18, 2006 (JP) .................................. 2006-010255
May 12, 2006 (JP) .................................. 2006-134231

(51) Int. Cl.
*B81B 1/00* (2006.01)
(52) U.S. Cl.
USPC ..................................... 366/341; 366/DIG. 3
(58) Field of Classification Search
USPC ........ 48/180.1, 189.4; 138/42, 44; 366/181.5, 366/337, 340, 341, DIG. 1–DIG. 4
See application file for complete search history.

(56) References Cited

U.S. PATENT DOCUMENTS

| | | | | |
|---|---|---|---|---|
| 630,315 A | * | 8/1899 | Barclay | 251/127 |
| 967,895 A | * | 8/1910 | Frederick | 220/374 |
| 1,086,260 A | * | 2/1914 | Abels | 137/177 |
| 1,088,711 A | * | 3/1914 | Lindmueller | 184/39.1 |
| 1,140,064 A | * | 5/1915 | Rakestraw | 261/156 |
| 1,377,970 A | * | 5/1921 | Parent | 138/42 |
| 1,383,886 A | * | 7/1921 | Webb, Sr. | 181/234 |
| 1,522,296 A | * | 1/1925 | Glazebrook | 165/52 |
| 1,675,349 A | * | 7/1928 | Francis et al. | 48/189.2 |
| 1,711,270 A | * | 4/1929 | Litle, Jr. | 138/42 |
| 1,720,247 A | * | 7/1929 | Smith | 48/189.4 |
| 1,784,673 A | * | 12/1930 | Loepsinger et al. | 251/127 |
| 2,126,545 A | * | 8/1938 | Field | 131/210 |
| 2,254,587 A | * | 9/1941 | Williams | 165/154 |
| 2,400,161 A | * | 5/1946 | Allerton et al. | 138/42 |
| 2,401,570 A | * | 6/1946 | Koehler | 138/26 |
| 2,669,946 A | * | 2/1954 | Peyton | 366/173.2 |
| 2,670,011 A | * | 2/1954 | Bertin et al. | 138/44 |
| 2,704,206 A | * | 3/1955 | Crook | 366/181.1 |
| 3,051,453 A | * | 8/1962 | Sluijters | 366/337 |
| 3,119,704 A | * | 1/1964 | Harrell et al. | 106/682 |
| 3,206,170 A | * | 9/1965 | Schippers et al. | 366/340 |
| 3,212,521 A | * | 10/1965 | Jean | 137/494 |

(Continued)

FOREIGN PATENT DOCUMENTS

| | | | | | |
|---|---|---|---|---|---|
| GB | 2001416 A | * | 1/1979 | | F16L 59/06 |
| JP | 52016054 A | * | 2/1977 | | B01F 5/02 |

(Continued)

*Primary Examiner* — Charles Cooley
(74) *Attorney, Agent, or Firm* — Dickstein Shapiro LLP

(57) ABSTRACT

Plural types of fluids that are incompatible with each other are merged. A disturbance is induced at an interface between the fluids by causing the fluids to flow through a merged flow passage having a cross-sectional area that changes. One type of the fluids is turned into microscopic liquid droplets.

12 Claims, 23 Drawing Sheets

(56) References Cited

U.S. PATENT DOCUMENTS

| | | | | |
|---|---|---|---|---|
| 3,223,121 A * | 12/1965 | Lee | | 366/340 |
| 3,328,003 A * | 6/1967 | Chisholm | | 366/337 |
| 3,361,412 A * | 1/1968 | Cole, III | | 366/268 |
| 3,688,800 A * | 9/1972 | Hayner et al. | | 138/42 |
| 3,715,105 A * | 2/1973 | Griffin | | 366/279 |
| 3,847,128 A * | 11/1974 | Palotsee | | 123/592 |
| 3,908,702 A * | 9/1975 | Klosse et al. | | 138/42 |
| 4,043,360 A * | 8/1977 | Yaron | | 138/42 |
| RE29,714 E * | 8/1978 | Hayner et al. | | 138/42 |
| 4,106,457 A * | 8/1978 | Totten et al. | | 123/557 |
| 4,147,481 A * | 4/1979 | Deutsch | | 417/572 |
| 4,215,822 A * | 8/1980 | Mehoudar | | 239/542 |
| 4,271,119 A * | 6/1981 | Columbus | | 422/50 |
| 4,279,274 A * | 7/1981 | Seger | | 138/42 |
| 4,302,313 A * | 11/1981 | Columbus | | 204/409 |
| 4,313,680 A * | 2/1982 | Honnen | | 366/337 |
| 4,370,062 A * | 1/1983 | Moody | | 366/130 |
| 4,411,292 A * | 10/1983 | Schiller | | 138/42 |
| 4,427,030 A * | 1/1984 | Jouwsma | | 138/42 |
| 4,487,510 A * | 12/1984 | Buurman et al. | | 366/337 |
| 4,618,476 A * | 10/1986 | Columbus | | 422/100 |
| 4,756,884 A * | 7/1988 | Hillman et al. | | 422/73 |
| 4,798,475 A * | 1/1989 | Strandberg | | 366/160.5 |
| 4,819,831 A | 4/1989 | Green et al. | | |
| 4,861,165 A * | 8/1989 | Fredriksson et al. | | 366/165.1 |
| 4,907,725 A * | 3/1990 | Durham | | 222/129.1 |
| 4,963,498 A * | 10/1990 | Hillman et al. | | 436/69 |
| 4,964,733 A * | 10/1990 | Fredriksson et al. | | 366/336 |
| 5,207,386 A * | 5/1993 | Mehoudar | | 239/542 |
| 5,332,313 A * | 7/1994 | Cimbalik et al. | | 366/303 |
| 5,368,235 A * | 11/1994 | Drozdoff et al. | | 239/542 |
| 5,368,382 A * | 11/1994 | Kawasaki et al. | | 366/2 |
| 5,495,872 A * | 3/1996 | Gallagher et al. | | 138/44 |
| 5,535,175 A * | 7/1996 | Niimi | | 366/336 |
| 5,565,063 A * | 10/1996 | Begemann et al. | | 162/216 |
| 5,672,821 A * | 9/1997 | Suzuki | | 73/202 |
| 5,726,026 A * | 3/1998 | Wilding et al. | | 435/7.21 |
| 5,811,062 A * | 9/1998 | Wegeng et al. | | 422/129 |
| 5,851,067 A * | 12/1998 | Fleischli et al. | | 366/337 |
| 5,928,880 A * | 7/1999 | Wilding et al. | | 435/7.21 |
| 5,944,419 A * | 8/1999 | Streiff | | 366/337 |
| 5,989,445 A * | 11/1999 | Wise et al. | | 216/62 |
| 5,992,769 A * | 11/1999 | Wise et al. | | 239/548 |
| 6,116,523 A * | 9/2000 | Cabahug et al. | | 239/542 |
| 6,129,973 A * | 10/2000 | Martin et al. | | 428/166 |
| 6,168,415 B1 * | 1/2001 | Pleasant et al. | | 425/552 |
| 6,213,453 B1 * | 4/2001 | Ou | | 261/78.1 |
| 6,235,175 B1 * | 5/2001 | Dubrow et al. | | 204/453 |
| 6,368,871 B1 * | 4/2002 | Christel et al. | | 436/180 |
| 6,523,572 B1 * | 2/2003 | Levin et al. | | 138/37 |
| 6,599,008 B2 * | 7/2003 | Heusser et al. | | 366/337 |
| 7,303,732 B2 * | 12/2007 | Gillis et al. | | 422/228 |
| 7,438,464 B2 * | 10/2008 | Moser et al. | | 366/336 |
| 7,553,434 B2 | 6/2009 | Kawai et al. | | |
| 7,648,085 B2 * | 1/2010 | Mavrakis et al. | | 239/542 |
| 7,681,810 B2 * | 3/2010 | Keren | | 239/542 |
| 2003/0226806 A1 | 12/2003 | Young et al. | | |
| 2004/0027915 A1 | 2/2004 | Lowe et al. | | |
| 2004/0141413 A1 * | 7/2004 | Keller | | 366/337 |
| 2004/0179427 A1 * | 9/2004 | Yamazaki et al. | | 366/348 |
| 2004/0261519 A1 * | 12/2004 | Nozoe et al. | | 73/204.21 |
| 2004/0262223 A1 * | 12/2004 | Strook et al. | | 210/634 |
| 2005/0078553 A1 * | 4/2005 | Wilken | | 366/336 |
| 2005/0167905 A1 * | 8/2005 | Detloff | | 271/90 |
| 2005/0232076 A1 * | 10/2005 | Yang et al. | | 366/336 |
| 2005/0276160 A1 * | 12/2005 | Woehl et al. | | 366/336 |
| 2006/0051448 A1 * | 3/2006 | Schryver et al. | | 425/381 |
| 2006/0108014 A1 * | 5/2006 | Marsh | | 138/42 |
| 2006/0187752 A1 * | 8/2006 | Keller | | 366/337 |
| 2006/0268660 A1 * | 11/2006 | Glanville | | 366/340 |
| 2006/0285433 A1 * | 12/2006 | Yang et al. | | 366/341 |
| 2007/0047388 A1 * | 3/2007 | DeNatale et al. | | 366/341 |
| 2007/0211570 A1 * | 9/2007 | Schauerte | | 366/337 |
| 2007/0242560 A1 * | 10/2007 | Norikane et al. | | 366/341 |
| 2007/0263485 A1 * | 11/2007 | Yang et al. | | 366/336 |
| 2009/0165879 A1 * | 7/2009 | Socolsky | | 138/42 |
| 2009/0245017 A1 * | 10/2009 | Paul et al. | | 366/337 |
| 2010/0124145 A1 * | 5/2010 | Ni et al. | | 366/340 |
| 2013/0258801 A1 * | 10/2013 | Almeida Rivera et al. | | 366/337 |

FOREIGN PATENT DOCUMENTS

| | | |
|---|---|---|
| JP | 7-120974 | 5/1995 |
| JP | 2733729 | 1/1998 |
| JP | 2000-273188 | 10/2000 |
| JP | 3218445 | 8/2001 |
| JP | 3476223 | 9/2003 |
| JP | 3511238 | 1/2004 |
| JP | 2004-98225 | 4/2004 |
| JP | 2004-122107 | 4/2004 |
| JP | 2004-197083 | 7/2004 |
| JP | 2004-243308 | 9/2004 |
| JP | 2004-358386 | 12/2004 |
| JP | 3635575 | 1/2005 |
| JP | 2005-185877 | 7/2005 |
| JP | 2005-213334 | 8/2005 |
| JP | 2005-238118 | 9/2005 |
| WO | WO-02/16017 A2 | 2/2002 |
| WO | WO-2004/002627 A2 | 1/2004 |

* cited by examiner

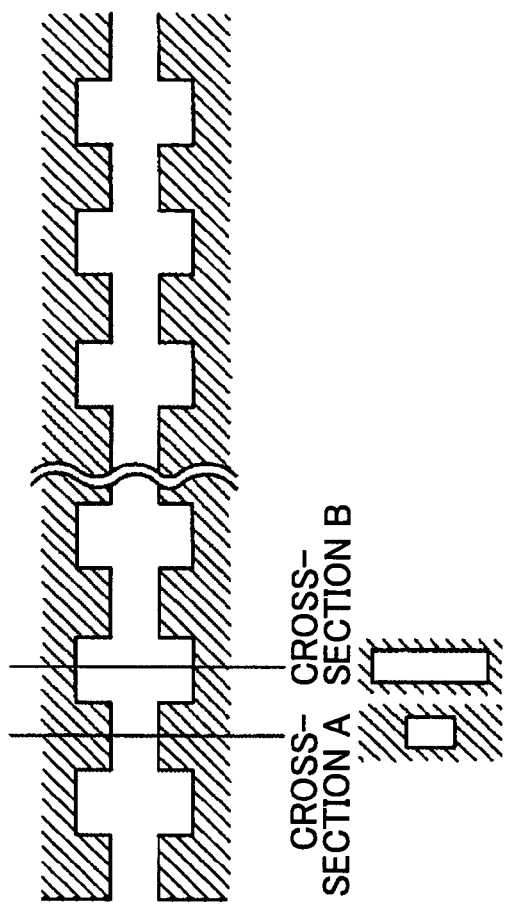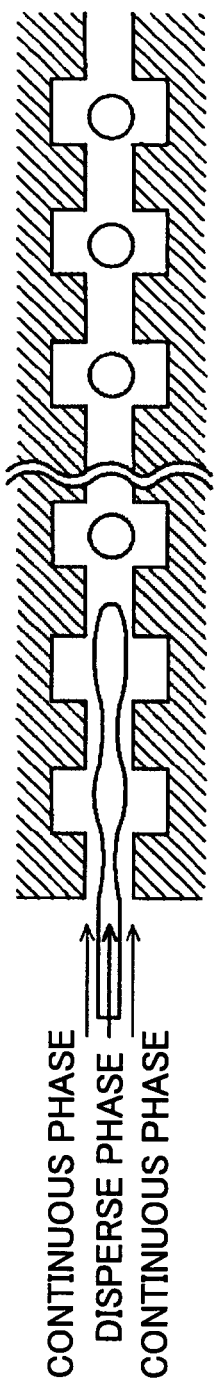

CONTINUOUS PHASE
DISPERSE PHASE

CONTINUOUS PHASE
DISPERSE PHASE (ASPECT RATIO 1.5)

(ASPECT RATIO 0.5)

(ASPECT RATIO 4)

(ASPECT RATIO 0.5)

MICROSCOPIC FLOW PASSAGE STRUCTURE, MICROSCOPIC LIQUID DROPLET GENERATING METHOD, MICROSCOPIC LIQUID DROPLET GENERATING SYSTEM, PARTICLES, AND MICROCAPSULES

BACKGROUND OF THE INVENTION

1. Field of the Invention

The present invention generally relates to a technology generically referred to as a micro-reactor and a micro-chemical process for controlling a fluid with a flow passage structure of several micrometers to several millimeters to stably realize a chemical engineering unit operation or an analysis within a short period of time. More particularly, the present invention relates to a microscopic flow passage structure, a microscopic liquid droplet generating method, a microscopic liquid droplet generating system, particles, and microcapsules.

The present invention can be applied to particles, particle dispersions and manufacturing methods thereof used for image display elements (polymerized toner, microcapsules used for cataphoresis type paperlike displays), emulsions used for drug delivery, coating, cosmetics, other emulsions, and photoconductive materials.

2. Description of the Related Art

Particles obtained by solidifying emulsions or dispersed phases in emulsions and capsule particles obtained by solidifying liquid droplet surfaces are used for various industrial purposes.

Presently, the following methods are used for industrial production of emulsified dispersions.

(1) Patent Document 1, etc., discloses a method of emulsification by a homogenizer.

(2) Patent Document 2, etc., discloses a method of ultrasonic emulsification.

The technologies of (1) and (2) are used for obtaining an emulsified dispersion from a substance. The substance to be dispersed into particles corresponds to a dispersed phase, and the dispersed phase is injected into a continuous phase. Shear force is repeatedly applied to the dispersed phase with mechanical actions. However, the shear force applied to the dispersed phase is inconsistent according to the emulsifying position, and therefore, the resultant particles become polydispersive (i.e., having inconsistent sizes).

(3). Patent Document 3, etc., discloses a method of emulsification by using a porous glass film. Conversely, in the method of (3), the dispersed phase and the continuous phase are partitioned with a porous glass film, the dispersed phase is pushed against the continuous phase so that the dispersed phase passes through the porous glass film and contacts the continuous phase, surface tension serves as the shear force, and the dispersed phase is finally turned into particles, thereby obtaining an emulsified dispersion.

However, sizes of the generated particles are affected by inconsistencies in the pore sizes, and therefore, the resultant particles become polydispersive.

There is a method of manufacturing highly monodispersive emulsified dispersions and particles as follows.

(4) Patent Document 4, etc., discloses a method of microchannel emulsification.

A film for dividing a dispersed phase and a continuous phase is artificially made to have a uniform structure. Therefore, considerably monodispersive particles can be obtained, where the standard deviation of diameters of particles/average diameter of particles is 0.03 or less. However, the sizes of the channels are smaller than the desired particle size. Therefore, when a liquid including particles is used as the dispersed phase, the channels may be clogged.

(5) Patent Document 5 discloses a method of generating monodispersive micro liquid droplets by using plural Y-type microchannels. However, it is difficult to form multiple flow passages and to guide the same amount of fluid into all of the flow passages. Further, the number of liquid droplets generated from one channel per one unit of time is several thousand, and therefore, yielding ability is low.

(6) Patent Document 6 discloses a method of manufacturing toner by membrane emulsification.

Patent Document 1: Japanese Patent No. 3476223
Patent Document 2: Japanese Patent No. 3218445
Patent Document 3: Japanese Patent No. 2733729
Patent Document 4: Japanese Laid-Open Patent Application No. 2000-273188
Patent Document 5: Japanese Laid-Open Patent Application No. 2004-358386
Patent Document 6: Japanese Laid-Open Patent Application No. H7-120974
Patent Document 7: Japanese Patent No. 3511238
Patent Document 8: Japanese Patent No. 3635575
Patent Document 9: Japanese Laid-Open Patent Application No. 2004-243308
Patent Document 10: Japanese Laid-Open Patent Application No. 2004-197083
Patent Document 11: Japanese Laid-Open Patent Application No. 2005-185877
Patent Document 12: Japanese Laid-Open Patent Application No. 2005-213334
Patent Document 13: Japanese Laid-Open Patent Application No. 2005-238118
Patent Document 14: Japanese Laid-Open Patent Application No. 2004-098225
Non-patent literature 1: Rayleigh, Lord "On the Instability of Jets" Proc. London Math. Soc. 110:4 [1878]
Non-patent literature 2: Schneider J. M., C. D. Hendricks, Rev. Instrum. 35 (10), 1349-50 [1964]
Non-patent literature 3: Lindblad N. R. and J. M. Schneider, J. Sci. Instrum. 42, 635 [1965]

SUMMARY OF THE INVENTION

The present invention provides a microscopic flow passage structure, a microscopic liquid droplet generating method, a microscopic liquid droplet generating system, particles, and microcapsules in which one or more of the above-described disadvantages is eliminated.

A preferred embodiment of the present invention provides a microscopic flow passage structure, a microscopic liquid droplet generating method, a microscopic liquid droplet generating system, particles, and microcapsules that can generate highly monodispersive microscopic liquid droplets and significantly increase production by employing a microchannel method having a simple structure.

An embodiment of the present invention provides a microscopic flow passage structure for generating microscopic liquid droplets, the microscopic flow passage structure including fluid introduction flow passages configured to individually introduce plural types of fluids that are incompatible with each other; a merged flow passage in which the fluids merge; a common outlet through which the fluids can be discharged from the merged flow passage; wherein the merged flow passage includes a region in which a cross-sectional area of the merged flow passage changes cyclically in a fluid flow direction.

An embodiment of the present invention provides a microscopic liquid droplet generating method including the steps of: (a) merging plural types of fluids that are incompatible with each other; (b) inducing a disturbance at an interface between the fluids by causing the fluids to flow through a merged flow passage having a cross-sectional area that changes; and (c) turning one of the types of the fluids into liquid droplets.

According to one embodiment of the present invention, a microscopic flow passage structure, a microscopic liquid droplet generating method, a microscopic liquid droplet generating system, particles, and microcapsules are provided, in which highly monodispersive microscopic liquid droplets are generated and production is significantly increased by employing a microchannel method having a simple structure.

BRIEF DESCRIPTION OF THE DRAWINGS

Other objects, features and advantages of the present invention will become more apparent from the following detailed description when read in conjunction with the accompanying drawings, in which:

FIG. 2A is a plan view of a top glass plate, FIG. 2B is a plan view of a bottom glass plate, and FIG. 2C is a cut-away side view;

FIG. 4A is a plan view of a top glass plate, FIG. 4B is a plan view of a bottom glass plate, and FIG. 4C is a cut-away side view;

FIG. 5A is a plan view of a top glass plate, FIG. 5B is a plan view of a bottom glass plate, and FIG. 5C is a cut-away side view;

FIG. 6A is a plan view of a top glass plate, FIG. 6B is a plan view of a bottom glass plate, and FIG. 6C is a cut-away side view;

FIGS. 9A, 9B are schematic diagrams for illustrating how liquid droplets are formed by protruding/depressed structures;

FIG. 18A is a plan view of a top glass plate, FIG. 18B is a plan view of a bottom glass plate, and FIG. 18C is a cut-away side view;

FIG. 19A is a plan view of a top glass plate, FIG. 19B is a plan view of a bottom glass plate, and FIG. 19C is a cut-away side view;

FIG. 28A illustrates a status before merging, and FIG. 28B illustrates a status after merging; FIG. 29A illustrates a status before merging and FIG. 29B illustrates a status after merging.

DETAILED DESCRIPTION OF THE PREFERRED EMBODIMENTS

A description is given, with reference to the accompanying drawings, of embodiments of the present invention.

A first embodiment of the present invention is described with reference to FIGS. 1-3.

Figure 3:
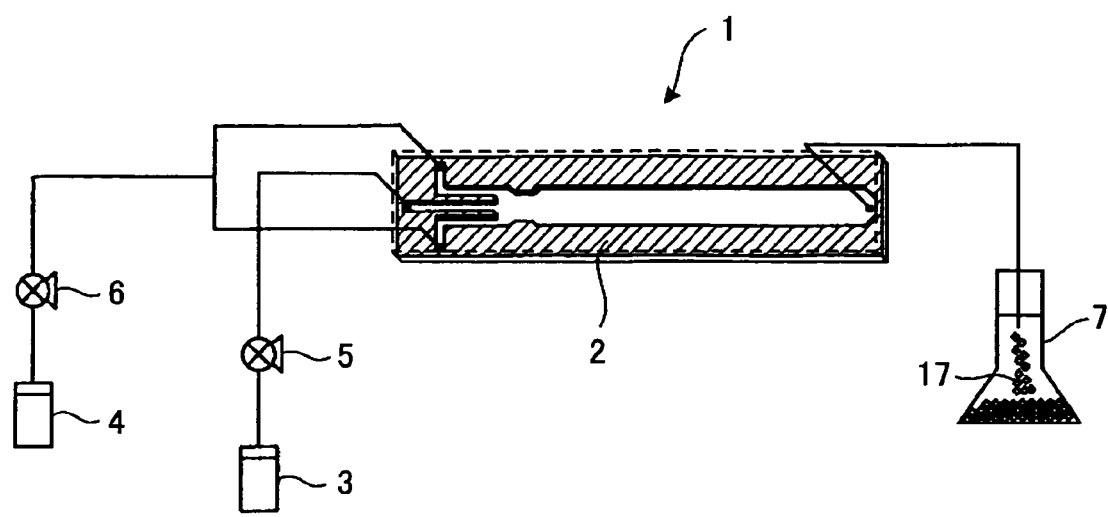
FIG. 3 is a microscopic liquid droplet generating system including the microscopic flow passage structure shown in FIG. 1.

First, referring to FIG. 3, an outline of a microscopic liquid droplet generating system 1 according to the first embodiment is described. The microscopic liquid droplet generating system 1 includes a microscopic flow passage structure 2, fluid tanks 3, 4 storing fluid to be supplied to the microscopic flow passage structure 2, pumps 5, 6 for sending out fluid from the fluid tanks 3, 4, and a recovery tank 7 for recovering microscopic liquid droplets generated by the microscopic flow passage structure 2.

Figure 1:
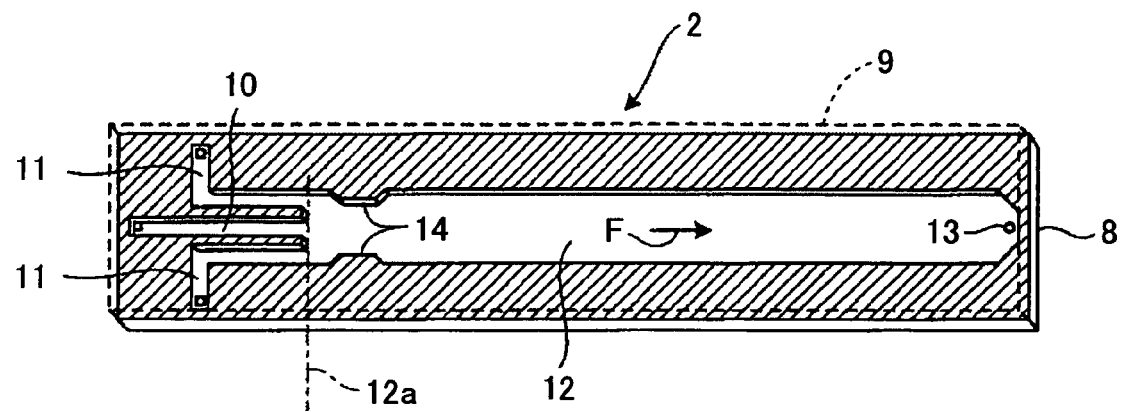
FIG. 1 is a schematic diagram of a microscopic flow passage structure according to a first embodiment of the present invention.

As shown in FIGS. 1, 2A-2C, the flow passage structure 2 having flow passage patterns is formed by bonding together two PYREX® glass plates 8, 9. In FIGS. 1, 2A-2C, the cross-hatching area indicates a fusion bonded surface between the glass plates. In FIG. 1, the top glass plate 9 is indicated by dashed lines for visual purposes.

The bottom glass plate 8 is patterned with flow passages by glass etching. As shown in FIG. 1, a fluid introduction flow passage 10 for introducing a fluid (dispersed phase) is formed in the middle of the glass plate 8. On both sides of the fluid introduction flow passage 10 are provided fluid introduction flow passages 11 for introducing a fluid (continuous phase) that is incompatible with the fluid introduced by the fluid introduction flow passage 10 (including fluids that are substantially incompatible).

"Incompatible fluids" refers to two fluids having a solubility less than or equal to 10% with respect to each other.

"Dispersed phase" refers to a fluid that is turned into liquid droplets by a liquid droplet forming unit according to an embodiment of the present invention. "Continuous phase" refers to a fluid serving as a medium for dispersing the liquid droplets generated by the liquid droplet forming unit according to an embodiment of the present invention.

A merged flow passage 12 is in communication with the fluid introduction flow passages 10, 11; the fluid introduction flow passages 10, 11 merge in the merged flow passage 12. A protruding structure 14 is provided at a position downstream in a direction of the fluid flow (indicated by arrow F) of a merge starting point 12a of the merged flow passage 12. The protruding structure 14 includes two trapezoidal parts facing each other protruding inward from corresponding sides of the merged flow passage 12, so as to change the cross-sectional area of the merged flow passage 12 (in this case, to narrow the passage).

The protruding structure 14 is provided in an area where liquid columns of the dispersed phase become unstable and turn into liquid droplets. Specifically, the protruding structure 14 is positioned so as to control the process of forming liquid droplets from dispersed phase. The effect that the protruding structure 14 has on forming microscopic liquid droplets is described in subsequent embodiments. The structure for changing the cross-sectional area of the merged flow passage 12 can be a depressed structure.

Figure 2A:
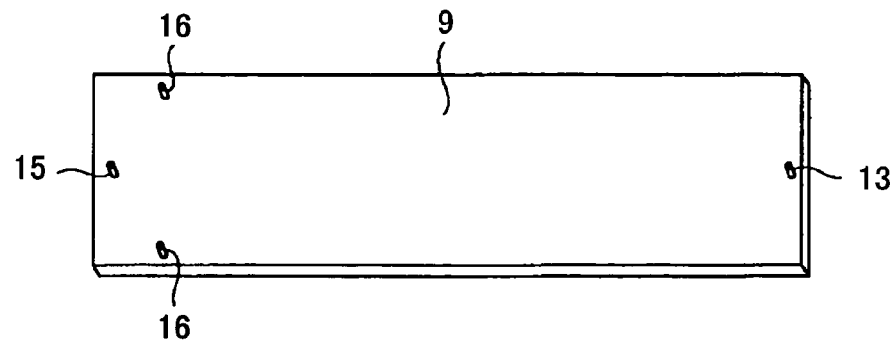
FIGS. 2A-2C are detailed diagrams of the microscopic flow passage structure shown in FIG. 1.
Figure 2B:
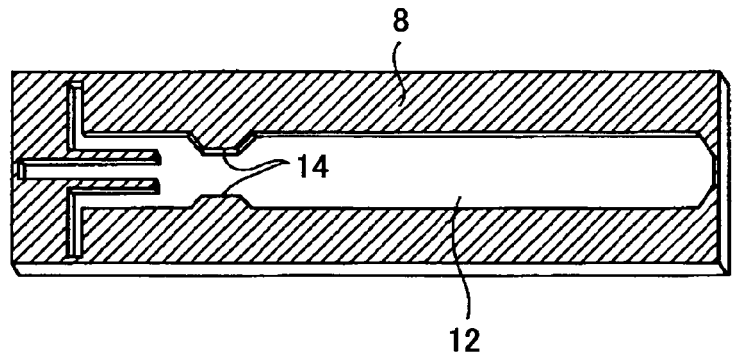
Figure 2C:
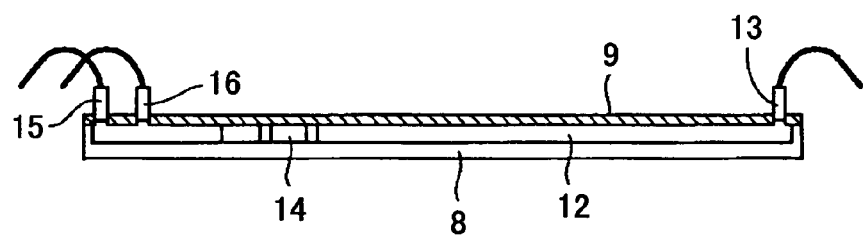

As shown in FIGS. 2A-2C, the top glass plate 9 has a fluid introduction inlet 15 in communication with the fluid introduction flow passage 10, fluid introduction inlets 16 in communication with the fluid introduction flow passages 11, and a common outlet 13.

Materials of the flow passages are not limited to silica glass; the flow passage can be made of resin that is insoluble to the dispersed phase and the continuous phase. The passage size depends on how the final product is to be used; effects of the present invention are realized when the width and the depth of the flow passage are in a range of 10 µm-1,000 µm.

When flow passages are formed by glass etching, the protruding/depressed structure for changing the cross-sectional area of the flow passage can be formed on the side surfaces of the flow passage as described above, on the bottom, or on the ceiling of the flow passage. When the protruding/depressed structure is formed on the bottom of the flow passage, it can be formed by two-stage etching.

The cross section of the flow passage is preferably circular; however, depending on conditions in processing the member configuring the flow passage, the cross section can be polygonal such as a rectangle, or substantially polygonal. The cross-sectional area preferably changes in a range of 10.0 µm²-10,000 µm². The cross-sectional area of the flow passage at the protruding/depressed structure can be larger or smaller than that at the fluid introduction inlet.

Further, liquid (fluid) is preferably supplied by a pressure liquid feeding method using a pump. As shown in FIG. 3, a liquid droplet dispersion 17 is recovered into the recovery tank 7 from the common outlet 13 positioned at the downstream edge of the merged flow passage 12.

Figure 4A:
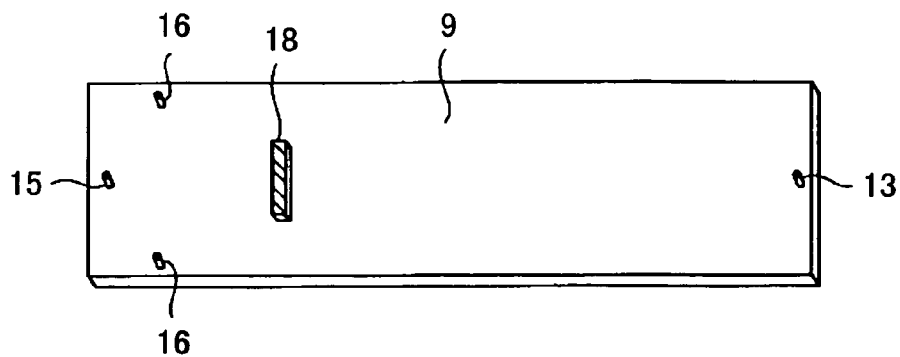
FIGS. 4A-4C are detailed diagrams of a microscopic flow passage structure according to a second embodiment of the present invention.
Figure 4B:
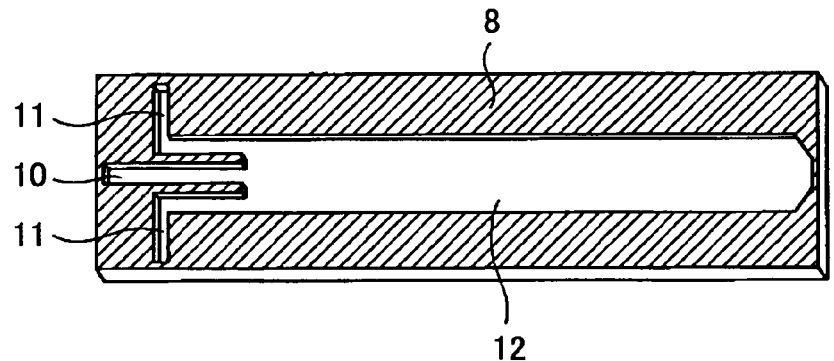
Figure 4C:
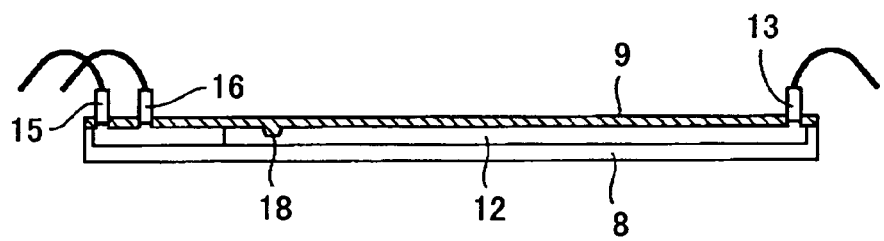

FIGS. 4A-4C illustrate a second embodiment according to the present invention. In FIGS. 4A-4C, elements corresponding to those in FIGS. 1A-1C are denoted by the same reference numbers, configurations and functions described above are not described unless necessary, and only chief parts are described (likewise in subsequent embodiments).

In the second embodiment, a protruding structure 18 for changing the cross-sectional area of the merged flow passage 12 is formed on the ceiling of the flow passage. Thus, the protruding structure 18 is formed on the top glass plate 9.

Accordingly, in the microscopic flow passage structure 2, the protruding structure 18, the fluid introduction inlets 15, 16, and the common outlet 13 are formed on the glass plate 9, and the glass plate 9 is bonded to the bottom glass plate 8.

Figure 5A:
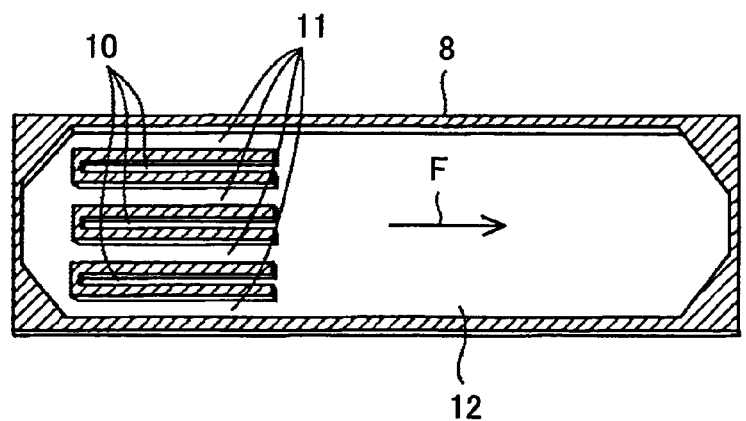
FIGS. 5A-5C are detailed diagrams of a microscopic flow passage structure according to a third embodiment of the present invention.
Figure 5B:
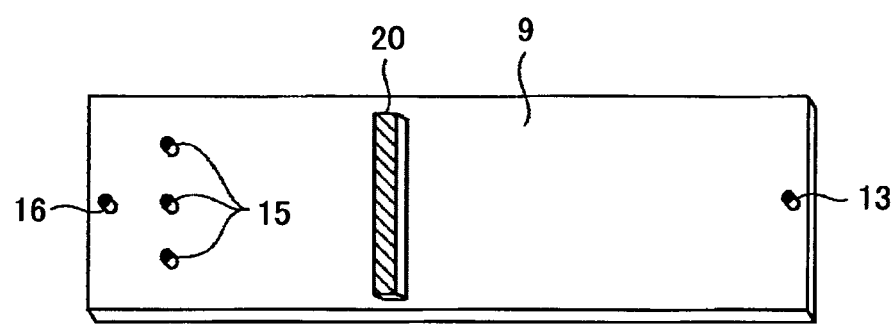
Figure 5C:
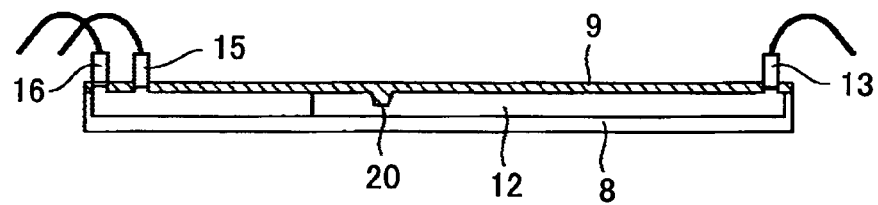

FIGS. 5A-5C illustrate a third embodiment according to the present invention. In the third embodiment, plural liquid columns of a fluid to be turned into liquid droplets are introduced simultaneously, thus enhancing productivity of forming microscopic liquid droplets.

Plural fluid introduction flow passages 10 for the dispersed phase and plural fluid introduction flow passages 11 for the continuous phase are alternately arranged by fluid type, in parallel (side-by-side) in a direction orthogonal to the direction of the flow of the fluid (width direction of the glass plate). The parallel passages are arranged such that the fluid in contact with the walls of the merged flow passage 12 is a continuous phase.

When there are plural introduction flow passages, the protruding/depressed structure for changing the cross-sectional areas of the flow passages is preferably formed on the bottom or the ceiling of the merged flow passage 12, in such a manner that the cross-sectional areas of the plural flow passages change by the same amount.

In consideration of the above, in the third embodiment, a protruding structure 20 is formed on the top glass plate 9. A single protruding structure 20 is provided for changing the cross-sectional areas of three flow passages by the same amount (microscopic liquid droplet forming effect).

FIGS. 6A-6C and FIG. 7 illustrate a fourth embodiment according to the present invention. In the fourth embodiment, the merged flow passage 12 includes an area 21 in which the cross-sectional area cyclically changes in the direction of the fluid flow.

Figure 6A:
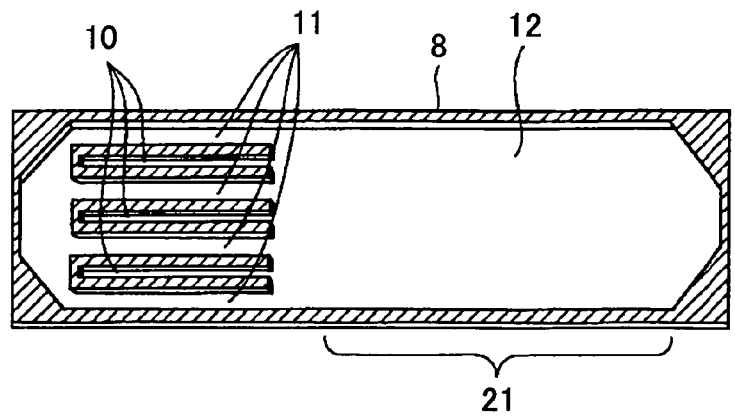
FIGS. 6A-6C are detailed diagrams of a microscopic flow passage structure according to a fourth embodiment of the present invention.
Figure 6B:
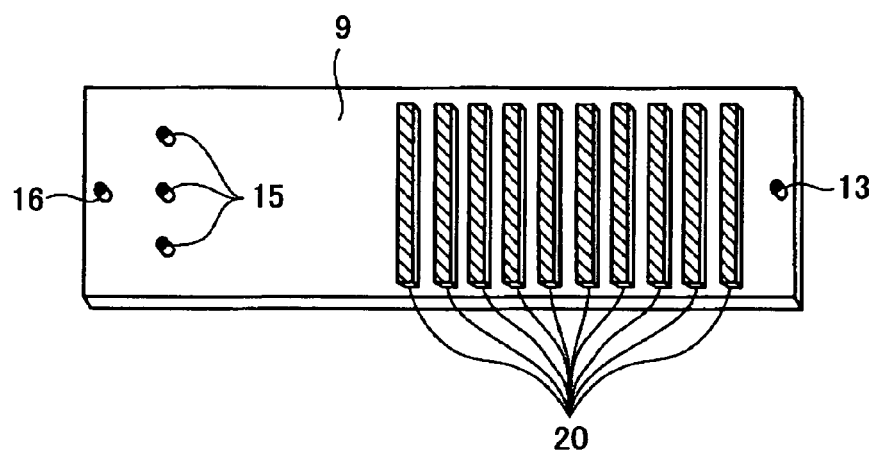
Figure 6C:
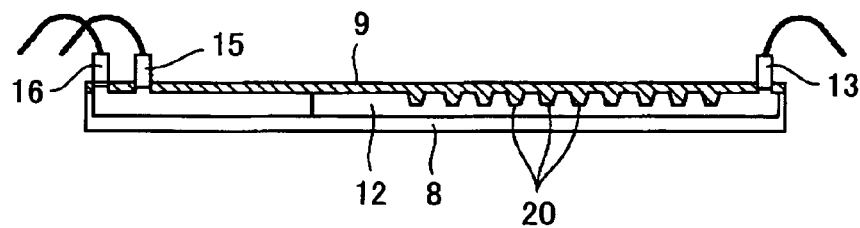

As shown in FIGS. 6A-6C, the area 21 includes plural protruding structures 20, which are equally spaced apart. As a result, the protruding structures 20 configure a cyclic structure including two or more protruding/depressed structures. The cycle is preferably repeated as many times as possible; the cycle is preferably repeated more than or equal to 10 times and less than 100 times to ensure that liquid droplets are stably formed. However, the number of cycles repeated is not limited thereto.

Figure 7:
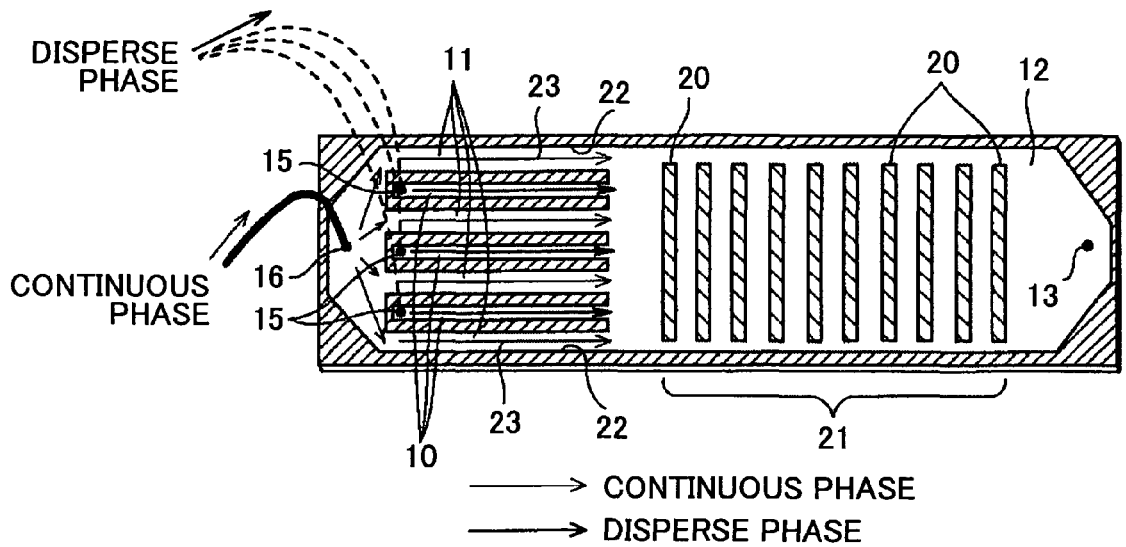
FIG. 7 is a plan view illustrating how fluids are introduced into the microscopic flow passage structure according to the fourth embodiment.

As shown in FIG. 7, the flow passages are arranged so that fluids 23 (continuous phases) in contact with walls 22 of the merged flow passage 12 at the edge of in the microscopic flow passages are always continuous phases.

Next, a detailed description is given of the effects of forming microscopic liquid droplets by changing the cross-sectional area of the merged flow passage 12.

Figure 8:
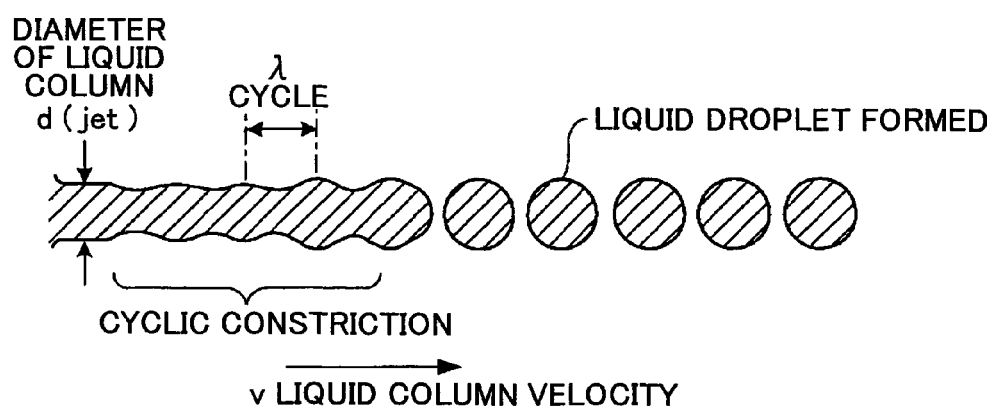
FIG. 8 is a schematic diagram illustrating how liquid droplets are typically formed.

According to an embodiment of the present invention, a destabilizing phenomenon in a columnar fluid in a microscopic flow passage is efficiently realized. A typical liquid droplet forming phenomenon is described with reference to FIG. 8.

(Liquid Droplet Forming Phenomenon)

Non-patent literature 1 describes a uniform liquid droplet forming phenomenon occurring in a liquid column. An infinitely long liquid column of fluid is provided in a still fluid. The liquid column is incompatible with the still fluid. A wavelength condition λ at which the liquid column is most unstable is expressed by the following formula (1), where the liquid column diameter is d(jet).

$$\lambda = 4.5 d(\text{jet}) \quad (1)$$

This formula is satisfied not only for the infinitely long liquid column, but also for liquid flowing at an initial velocity discharged from a through hole into a still fluid or flowing fluid. A frequency f of a disturbance phenomenon can be expressed by the following formula (2), where the velocity of the liquid column is v. Due to this instability, the liquid column can no longer maintain its shape, and the liquid column turns into liquid droplets having a volume corresponding to each cycle of (1).

$$f = v/\lambda \quad (2)$$

As described in non-patent literature 2, experiments were conducted to find conditions under which uniform particles can be stably formed. It was found that uniform particles are stably formed under the conditions expressed by the formula (3).

$$3.5 < \lambda/d(\text{jet}) < 7.0 \quad (3)$$

The upper limit (3.5) and the lower limit (7.0) in the formula (3) may vary depending on the type of fluid. The condition may be satisfied with the upper limit being 3.0 and the lower limit being 10.0; however, the ranges between 3.0 and 3.5 and between 7.0 and 10.0 are transitional, and liquid droplet diameters became uneven in some cases in such ranges.

As described in non-patent literature 3, based on conservation of energy, the minimum jet velocity V(min) at which liquid discharged from through holes forms liquid columns is expressed by the following formula (4).

$$v(\text{min}) = (8\sigma/\rho d(\text{jet}))^{(1/2)} \quad (4)$$

In formula (4), σ is surface tension of the liquid, ρ is liquid density, and d(jet) is the diameter of a liquid column. The condition formulas (1) through (4) are useful for estimating conditions for reproducing the above described phenomenon; however, the inventors of the present invention have confirmed that these formulas may vary according the type of liquid substance, the compound, the dispersion, etc.

When liquid droplets are formed based on conditions estimated by the above condition formulas, the state of a single liquid column may change with time, or states of adjacent liquid columns may be different from each other. As a result, the status of destabilization may vary as time passes; therefore, it is considerably difficult to produce a large amount of microscopic liquid droplets having uniform diameters.

In an embodiment of the present invention, the cross-sectional area of the merged flow passage 12 is changed to intentionally induce uniform disturbances at interfaces of the two fluids. This prevents effects of subtle changes in the conditions, so that liquid droplet diameters are consistently uniform.

That is, in an embodiment of the present invention, the destabilizing phenomenon of the columnar fluid is used to prevent diameters from becoming uneven.

These considerations are taken into account in forming the protruding structure 14, the protruding structure 18, the protruding structure 20, and the protruding/depressed cyclic structure described in the above embodiments.

The principle of the liquid droplet forming phenomenon caused by the protruding/depressed structure is described with reference to FIGS. 9A, 9B.

FIGS. 9A, 9B are cross-sectional views of a flow passage taken along a normal line in the direction of the fluid flow in the flow passage. The velocity at which a fixed flow quantity of fluid passes through a flow passage is inversely proportional to the cross-sectional area of the flow passage. Accordingly, the flow velocity is fast at cross section A, and the flow velocity is slow at cross section B.

When there are protruding/depressed structures on the wall of a flow passage such that cross-sectional areas of the flow passage vary at different positions, and a fixed flow quantity of a fluid is made to pass through the flow passage, the velocity of the fluid changes depending on the position.

As shown in FIG. 9B, when a dispersed phase fluid and a continuous phase fluid that are incompatible with each other are made to flow through a microscopic flow passage having the protruding/depressed structures, the velocities of both fluids change due to changes in the cross-sectional area, as described above.

An embodiment of the present invention takes advantage of this feature in order to stably and efficiently realize a destabilizing phenomenon of the columnar fluid.

Figure 10:
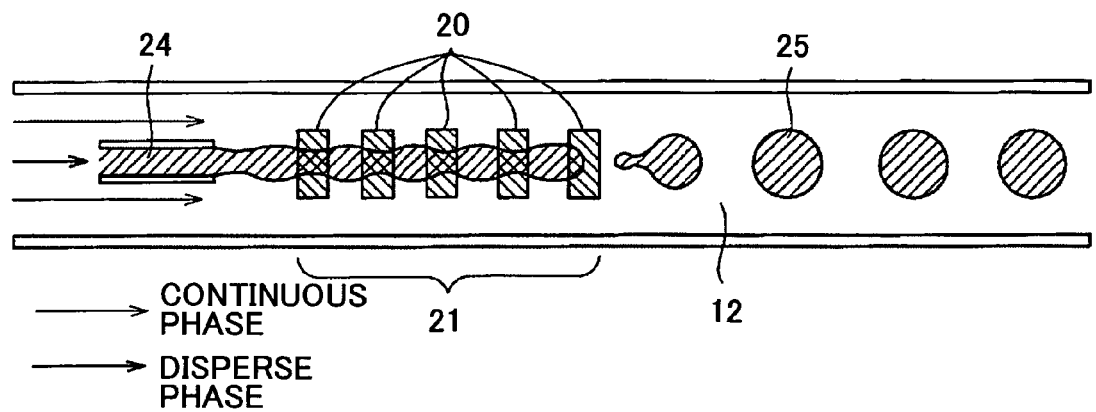
FIG. 10 is a schematic diagram for illustrating how liquid droplets are formed by protruding/depressed cyclic structures.

This feature is applied to the configuration of the fourth embodiment, as shown in FIG. 10. A dispersed phase introduced into a flow passage having a cyclic structure forms a liquid column in the continuous phase. A protruding/depressed cyclic structure in the area 21 induces disturbances at interfaces of the two fluids (phases). Accordingly, a dispersed phase 24 is turned into liquid droplets, thereby generating microscopic liquid droplets 25.

In the model illustrated in FIGS. 9A, 9B, the protruding/depressed cyclic structure is provided symmetrically along the direction of the fluid flow. However, the disturbance phenomenon can be induced by the changes in the cross-sectional areas of the flow path even if the protruding/depressed cyclic structure is provided only on one side, on the bottom, or on the ceiling of the merged flow passage 12.

Figure 11:
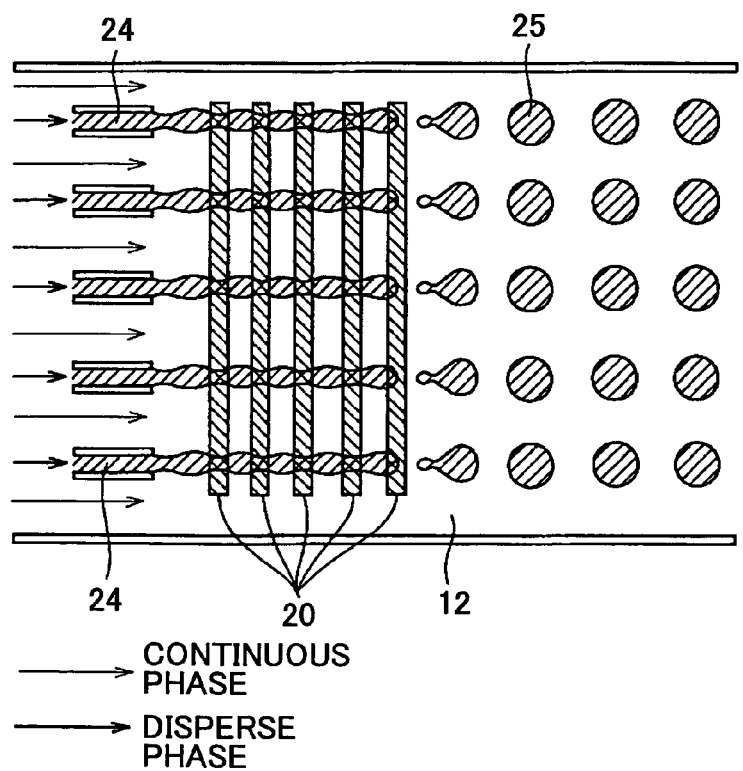
FIG. 11 is a schematic diagram for illustrating how liquid droplets are formed by a protruding/depressed cyclic structure in a system including dispersed phases and continuous phases arranged alternately.

Further, the same phenomenon can be induced by providing the protruding/depressed cyclic structure in a system where dispersed phases and continuous phases are arranged alternately, as shown in FIG. 11.

The protruding/depressed cyclic structure provides equal effects on plural columnar fluids, so that the microscopic liquid droplets generated from the dispersed phases have uniform diameters.

The diameters of the microscopic liquid droplets are less uniform when a single protruding structure or a single depressed structure is employed, compared to the case of employing a cyclic structure including plural protruding/depressed structures. However, even with a single protruding/depressed structure, effects of the above-described "intentionally induced uniform disturbances" can be provided to stably produce uniform liquid droplets.

According to Rayleigh's instability principle, a columnar fluid becomes most unstable when the wavelength of the disturbance is approximately 4.5 times the diameter of the columnar fluid of the dispersed phase. Further, liquid droplets are stably formed when the wavelength of the disturbance is between 3 to 10 times the diameter of the columnar fluid of the dispersed phase. The diameter of the columnar fluid can be decreased or increased by changing the speed of the continuous phase.

Therefore, the wavelength of the cyclic structure is preferably in a range of 3.0-10.0 times the narrowest portion of the dispersed phase (circle-equivalent diameter immediately before merging), more preferably in a range of 3.5-7.0 times.

Figure 12:
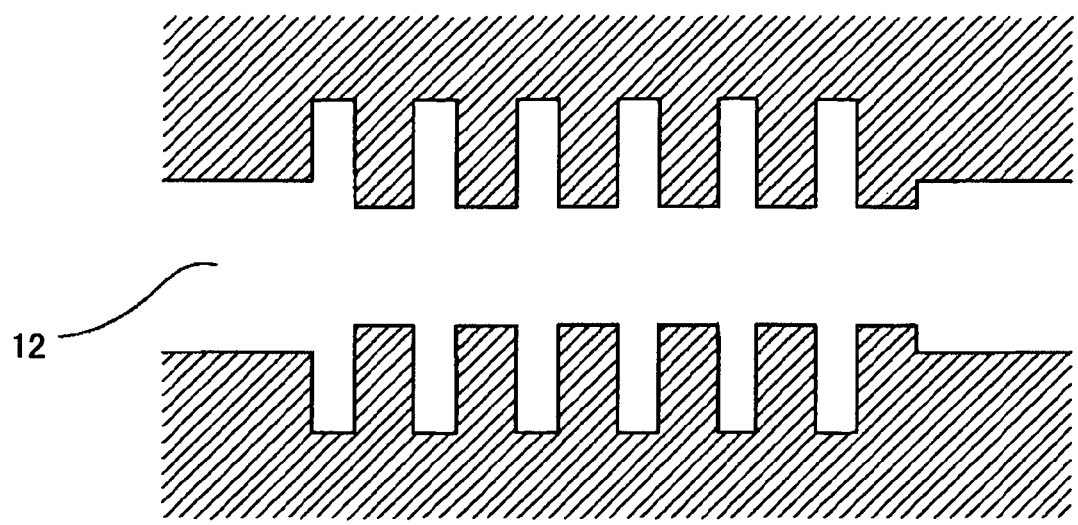
FIG. 12 is a schematic diagram illustrating a shape of a protruding/depressed cyclic structure.
Figure 13A:
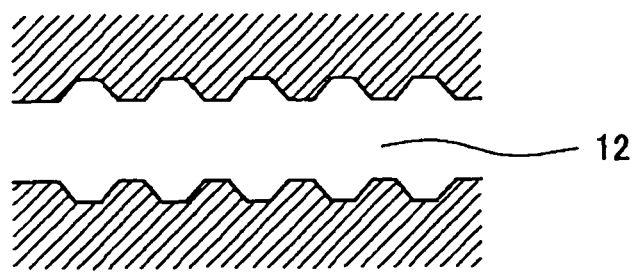
FIGS. 13A-13C are schematic diagrams illustrating other shapes of protruding/depressed cyclic structures.
Figure 13B:
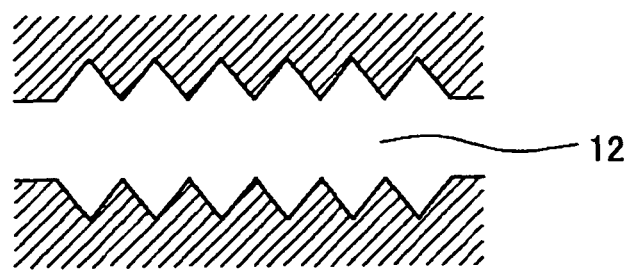
Figure 13C:
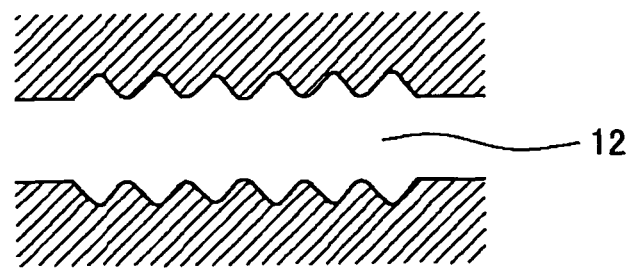

The shape of the protruding/depressed cyclic structure can be a rectangular wave shape in which the angle between two adjacent sides is a right angle as shown in FIG. 12, or other types of wave shapes as shown in FIGS. 13A-13C. These shapes are appropriately determined so that this area is not affected by satellites (microscopic particles) generated at a certain speed.

The wave shapes include shapes in which the angle between two adjacent sides is not a right angle (e.g., FIG. 13A), such as a triangular wave shape (e.g., FIG. 13B) or a curved wave shape (e.g., FIG. 13C).

Figure 14:
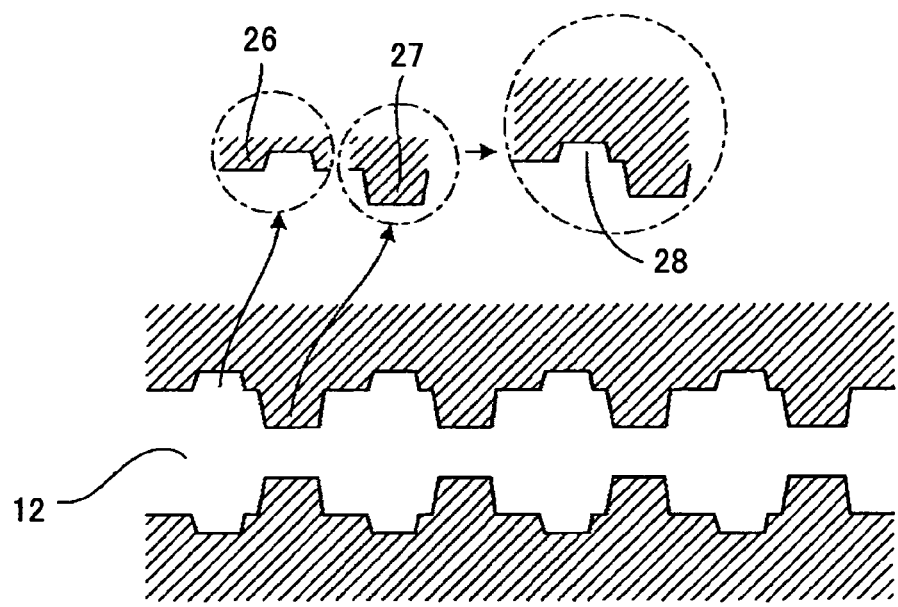
FIG. 14 is a schematic diagram illustrating yet another shape of a protruding/depressed cyclic structure.

The wave shape can be a combination of two or more arbitrary shapes, as shown in FIG. 14. In this example, a combination 28 of two arbitrary shapes 26, 27 form one cycle in the cyclic structure. These shapes are also appropriately determined so that this area is not affected by satellites generated at a certain speed.

Figure 15:
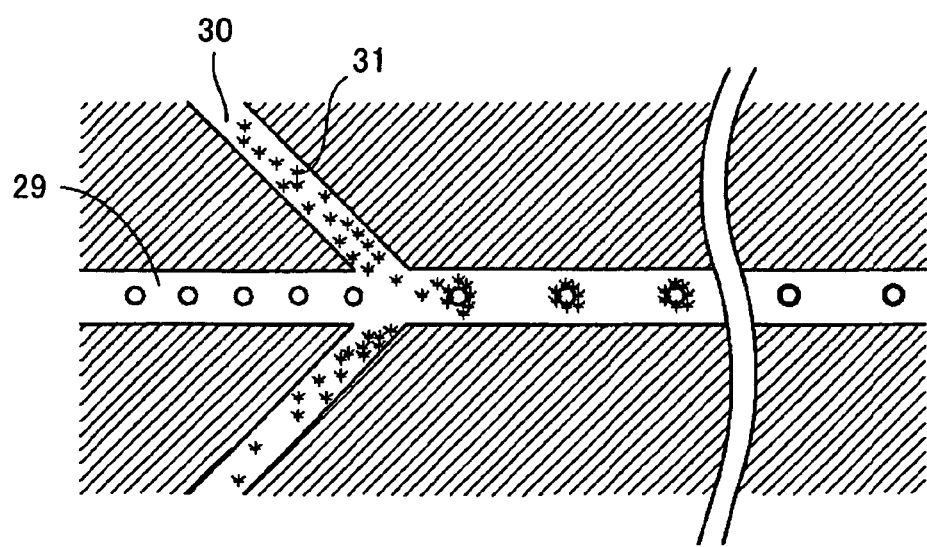
FIG. 15 illustrates a process for forming a film on a surface of a liquid droplet according to a fifth embodiment of the present invention.

FIG. 15 illustrates a fifth embodiment according to the present invention. The fifth embodiment requires a process of forming a film on the liquid droplet surface at the end of the liquid droplet forming flow passage (downstream in the direction of the fluid flow). Specifically, a fluid including a film forming material 31 is introduced into a main flow passage 29 from a branch flow passage 30. It is possible to employ a film forming method of depositing the material onto the liquid droplet surface or causing a chemical reaction on the liquid droplet surface.

The branch flow passage 30 is provided downstream of the cyclic structure in the embodiments described above. A unit for forming a film on a liquid droplet surface includes the branch flow passage 30 and a not shown means for supplying the film forming material 31.

The film forming process is not necessarily performed by using a flow path system; it is possible to perform a typical encapsulating process on an emulsion recovered at the outlet of the flow passage.

Particles obtained by solidifying microscopic liquid droplets formed by the liquid droplet forming method can be used as toner. If the variance is 5% or less, a toner having excellent image granularity and excellent powder fluidity can be achieved.

Microcapsules having a variance of 5% or less formed by the liquid droplet forming method according to the fifth embodiment can be used as cataphoresis microcapsules. As particle diameters are uniform, an electronic paper having a high level of whiteness can be provided.

Preferable guidelines concerning configurations and materials are given below for implementing the present invention.

(Flow Passage Structure, Fluid Introduction Inlet, Fluid Discharge Outlet)

Flow passage patterns are formed on one PYREX® glass plate by a regular glass etching method. Another PYREX® glass plate having an inlet/outlet for fluid is put on the first plate. After being positioned, the two plates are bonded together by heat sealing, thereby forming a flow passage having an inlet/outlet.

(Fluid Conveying Pump)

Means for conveying fluid include, but are not limited to, a syringe pump, a pressurized liquid sending method using inert gas, a peristaltic pump, and a diaphragm pump. To introduce liquid into a flow passage of micrometer order, a pump that can pressurize for a pressure drop of approximately 100 kPa-1,000 kPa is used.

In the following practical examples, a pressurized liquid sending method using inert gas was employed. The inert gas is to be inert to the chemical liquid used. In the following practical examples, nitrogen gas was used.

(Piping, Connection)

The pipe is to be inert to the chemical liquid and insoluble to the chemical liquid. Furthermore, the pipe is to be pressure resistant. The material of the pipe depends on the type of the chemical liquid, including, but not limited to, Teflon®, various metals, and PEEK. A pipe made of PEEK was employed in the following practical examples.

When connecting two pipes, connecting a pipe and a liquid tank, or connecting a pipe and a flow passage structure, the connection part is to be inert to the chemical liquid used, insoluble to the chemical liquid, and leakproof. Furthermore, the connection part needs to be pressure resistant. Therefore, the connection method and material are selected depending on usage conditions.

The connection part can be connected with, but not limited to, a rubber O ring, a Teflon® resin-made O ring, an adhesive, or a flange. The material of the connection part includes, but is not limited to, Teflon®, various metals, and PEEK. The material depends on the type of chemical liquid. In the following practical examples, the connection part was made of PEEK, which was connected by a flange. Generally available components were used, such as those employed in high pressure liquid chromatography.

(Granulation Process Overview)

Figure 16:
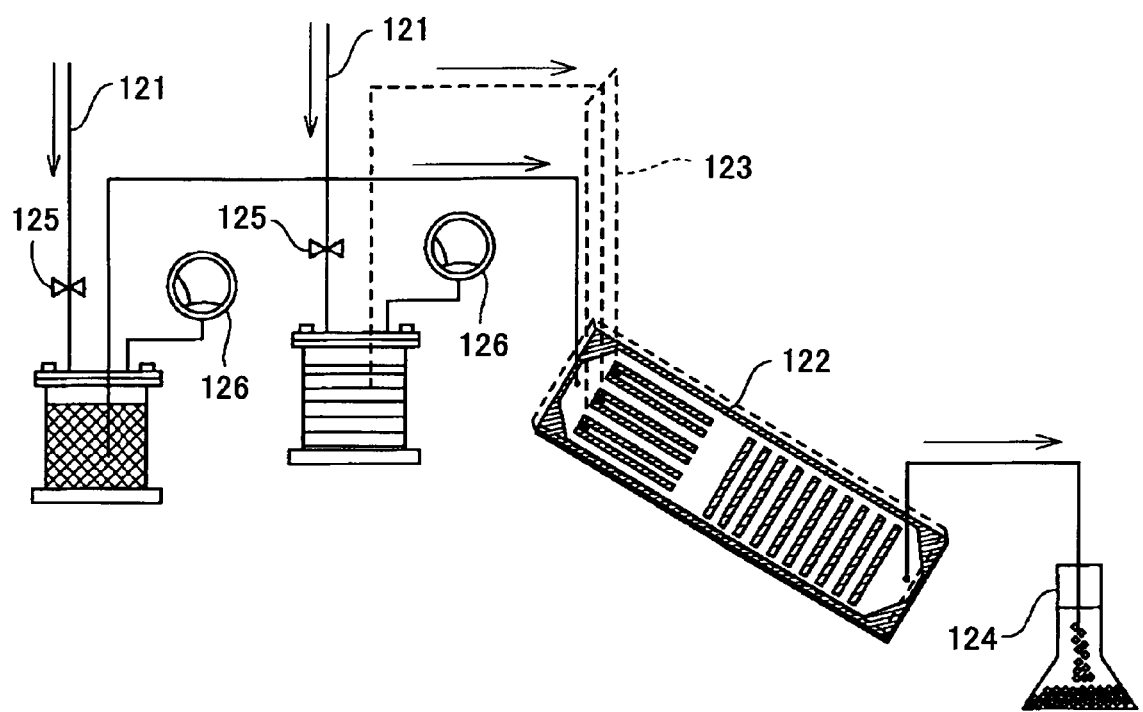
FIG. 16 is a schematic diagram illustrating a granulation process (microscopic liquid droplet generating system)

FIG. 16 is an overall diagram of a granulation process performed in the following practical examples. Continuous phases and dispersed phases are introduced to a microscopic flow passage structure 122 by pressurized liquid sending mechanisms 121•using dry nitrogen. A pipe 123 and the microscopic flow passage structure 122 are connected by a connector.

Generated emulsion is collected in a recovery container 124. Needle valves 125 are provided in pipes of the pressurized liquid sending mechanisms 121 to adjust the flow amounts of the continuous phases and the dispersed phases. Pressure gauges 126 are provided for confirming the pressure applied on the fluids. Further, a temperature adjusting mechanism can adjust the temperature of the microscopic flow passage structure 122, the pipe 123, and a storage tank, between −20° C. and 150° C.

(Materials of Dispersed Phase and Continuous Phase, Dispersing Agent, Surfactant)

The method according to an embodiment of the present invention can be implemented if the dispersed phase and the continuous phase have a compatibility of 10% or less, more preferably 1% or less. Typical dispersing agents and surfactant are not required for forming liquid droplets. However, the dispersed phase and the continuous phase may be combined when they are recovered. Therefore, such agents are preferably included at a critical concentration or higher, or added in a subsequent process.

The dispersing agent can be made from gelatin or polyvinyl alcohol. Examples of surfactant are anionic surfactant such as alkyl benzene sulfonate, alpha olefin sulfonate, phosphate; amine salt type surfactant such as alkylamine salt, amino alcohol fatty acid derivative, polyamine fatty acid derivative, imidazoline; quaternary ammonium salt type cationic surfactant such as alkyl trimethyl ammonium salt, dialkyl dimethyl ammonium salt, alkyl dimethyl benzylammonium salt, pyridinium salt, alkyl isoquinolinium salt, benzethonium chloride; nonionic surfactant such as fatty acid amide derivative, polyalcohol derivative; and amphoteric surfactant such as alanine, dodecyl di(aminoethyl)glycine, di(octyl-aminoethyl)glycine, N-alkyl-N,N-dimethyl ammonium betaine.

By using surfactant having a fluoro alkyl group, effects can be enhanced with an extremely small amount. Preferable examples of the anion surfactant having a fluoro alkyl group include fluoro alkyl carboxylic acid with carbon number from 2 to 10 or metallic salts thereof; perfluoro octane sulfonyl glutamic acid disodium, 3-[omega-fluoro alkyl(C6-C11) oxy]-1-alkyl(C3-C4)sodium sulfonate, 3-[omega-fluoro alkanoyl(C6-C8)-N-ethyl amino]-1-propane sulfonic sodium, fluoro alkyl(C11-C20)carboxylic acid or metallic salts thereof; perfluoro alkyl carboxylic acid (C7-C13) or metallic salts thereof; perfluoro alkyl(C4-C12)sulfonic acid or metallic salts thereof; perfluoro octane sulfonic acid diethanol amide, N-propyl-N-(2 hydroxyethyl)perfluoro octane sulfone amide, perfluoro alkyl(C6-C10)sulfone amide propyl trimethyl ammonium salt, perfluoro alkyl(C6-C10)-N-ethyl sulfonyl glycine salt, and monoperfluoroalkyl(C6-C16)ethyl phosphate ester.

As a commercial item of the anion surfactant having a fluoro alkyl group, for example, Surflon S-111, S-112, and S-113 (manufactured by Asahi Glass Co., Ltd.), Fluorad FC-93, FC-95, FC-98, and FC-129 (manufactured by Sumitomo 3M), Unidyne DS-101 and DS-102 (manufactured by Daikin Industries, Ltd.), Megaface F-110, F-120, F-113, F-191, F-812, and F-833 (manufactured by Dainippon Ink), Eftop EF-102, 103, 104, 105, 112, 123A, 123B, 306A, 501, 201, and 204 (manufactured by JEMCO Inc.), FTERGENT F-100 and F150 (manufactured by Neos) can be cited.

Examples of the cation surfactant having a fluoro alkyl group include fatty series primary or secondary amino acid having a fluoro alkyl group, fatty series quaternary ammonium salt such as perfluoro alkyl(C6-C10)sulfone amide propyl trimethyl ammonium salt, benzal conium salt, benzethonium chloride, pyridinium salt, and imidazolinium salt. As a commercial item of the cation surfactant having a fluoro alkyl group, for example, Surflon S-121 (manufactured by Asahi Glass Co., Ltd.), Fluorad FC-135 (manufactured by Sumitomo 3M), Unidyne DS-202 (manufactured by Daikin Industries, Ltd.), Megaface F-150 and F-824 (manufactured by Dainippon Ink), Eftop EF-132 (manufactured by JEMCO Inc.), FTERGENT F-300 (manufactured by Neos) can be cited.

Further, it is possible to stably disperse toner constituents in water using a polymeric protection colloid. Specific examples of such protection colloids include polymers and copolymers prepared using monomers such as acids (e.g., acrylic acid, methacrylic acid, alpha-cyanoacrylic acid, alpha-cyanomethacrylic acid, itaconic acid, crotonic acid, fumaric acid, maleic acid and maleic anhydride), (meta) acrylic monomers having a hydroxy group (e.g., beta-hydroxyethyl acrylate, beta-hydroxyethyl methacrylate, beta-hydroxypropyl acrylate, beta-hydroxypropyl methacrylate, gamma-hydroxypropyl acrylate, gamma-hydroxypropyl methacrylate, 3-chloro-2-hydroxypropyl acrylate, 3-chloro-2-hydroxypropyl methacrylate, diethyleneglycolmonoacrylic acid esters, diethyleneglycolmonoacrylic acid esters, glycerinmonoacrylic acid esters, glycerinmonomethacrylic acid esters, N-methylolacrylamide and N-methylolmethacrylamide), vinyl alcohol and its ethers (e.g., vinyl methyl ether, vinyl ethyl ether and vinyl propyl ether), esters of vinyl alcohol with a compound having a carboxyl group (e.g., vinyl acetate, vinyl propionate and vinyl butyrate); acrylic amides (e.g., acrylamide, methacrylamide and diacetoneacrylamide) and their methylol compounds, acid chlorides (e.g., acrylic acid chloride and methacrylic acid chloride), and monomers having a nitrogen atom or an alicyclic ring having a nitrogen atom (e.g., vinyl pyridine, vinyl pyrrolidone, vinyl imidazole and ethylene imine). In addition, polymers such as polyoxyethylene compounds (e.g., polyoxyethylene, polyoxypropylene, polyoxyethylenealkyl amines, polyoxypropylenealkyl amines, polyoxyethylenealkyl amides, polyoxypropylenealkyl amides, polyoxyethylene nonylphenyl ethers, polyoxyethylene laurylphenyl ethers, polyoxyethylene stearylphenyl esters, and polyoxyethylene nonylphenyl esters); and cellulose compounds such as methyl cellulose, hydroxyethyl cellulose and hydroxypropyl cellulose, can also be used as the polymeric protective colloid.

When a dispersing agent is used, the dispersing agent can be left adhering on liquid droplet surfaces. However, in a case where it is important to maintain insulation of liquid droplets, the dispersing agent can be removed.

(Encapsulating Process)

A coacervation method or an ultraviolet curing method, etc., can be employed for an encapsulating process. In the following practical examples, a simple coacervation method was employed. Specifically, emulsion discharged from a flow passage structure was introduced into a 10% gelatin water solution heated to 45 degrees Celsius, and ethanol was added by small portions. When the ethanol concentration is approximately 50%, the solution is cooled, so that the colloid is micro-capsulated.

(Liquid Droplet Solidifying Process)

Liquid droplets can be solidified by including a monomer capable of a crosslinking reaction and a radical polymerization initiator in the dispersed phase, and initiating polymerization by ultraviolet rays or heat.

(Particle Diameter Evaluation Means)

Some of the recovered liquid droplets or capsules were extracted, and observed on a preparation with a microscope. An image analysis method was employed to obtain the average particle diameter of 1,000 particle images and a dispersion value (standard deviation of diameter)/(average diameter).

(Parallel Arrangement)

Figure 17:
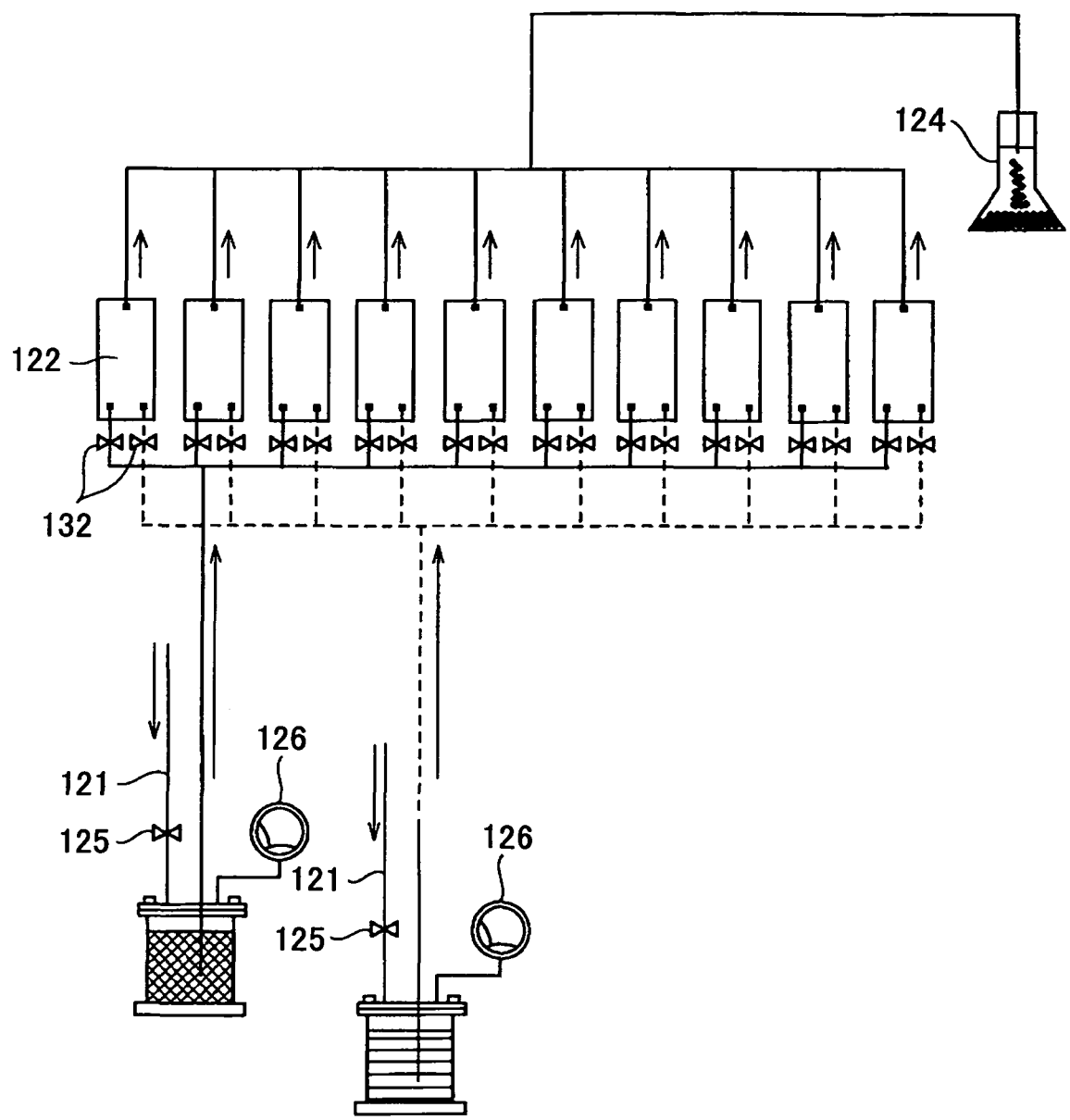
FIG. 17 is a schematic diagram of a system for performing large-scale production by arranging microscopic flow passage structures in parallel.

When multiple microscopic flow passage structures 122 are operated in parallel as illustrated in FIG. 17, flow amount adjusting mechanisms 132 are provided immediately before introduction parts of the microscopic flow passage structures 122, so that equal amounts of fluid are sent into the microscopic flow passage structures 122.

As a result of further studies, it was found that formation of liquid droplets is affected by the shape of the outlet of the dispersed phase flow passage, where the flow passages of the dispersed phase and the continuous phase merge.

Therefore, the cross-sectional shape of the outlet of the flow passage of the dispersed phase (shape of boundary between the merged flow passage 12) is determined as follows. Specifically, assuming that a width direction is the direction in which the flow passages of the dispersed phases and the continuous phases are arranged, and a depth direction is the direction orthogonal to the width direction, the shape of the outlet is made to satisfy a condition that "length in the depth direction/length in the width direction" (aspect ratio) is greater than or equal to one. When the aspect ratio is greater than or equal to one, liquid droplets can be formed properly.

Figure 22A:
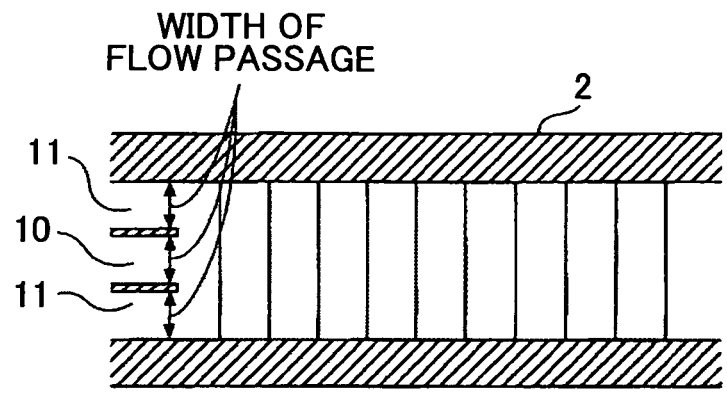
FIGS. 22A-22C illustrate a basic configuration of a microscopic flow passage structure with protruding/depressed structures arranged in the depth direction.
Figure 22B:
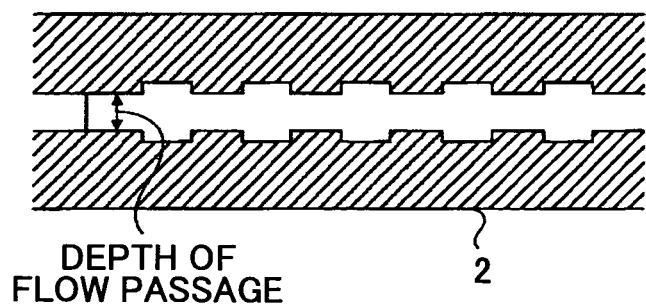
Figure 22C:
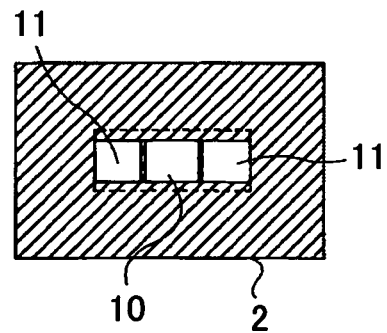
Figure 23A:
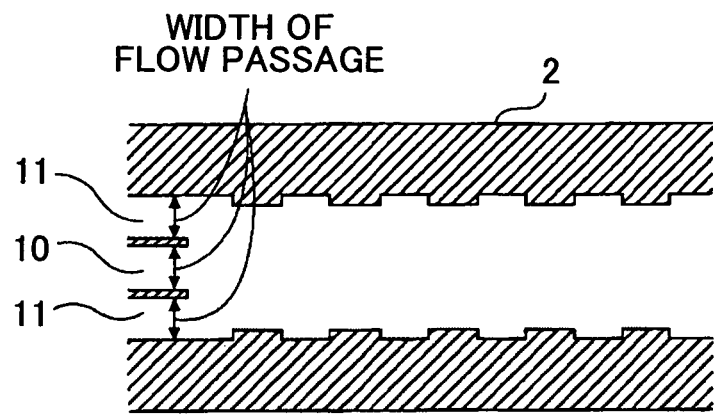
FIGS. 23A-23C illustrate a basic configuration of a microscopic flow passage structure with protruding/depressed structures arranged in the width direction.
Figure 23B:
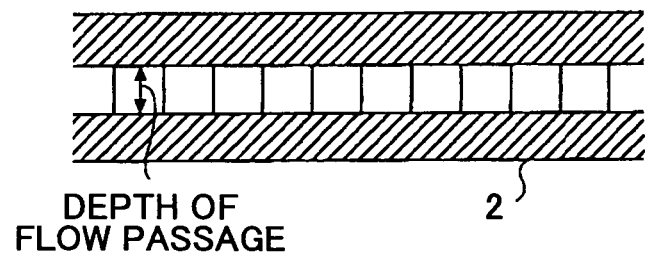
Figure 23C:
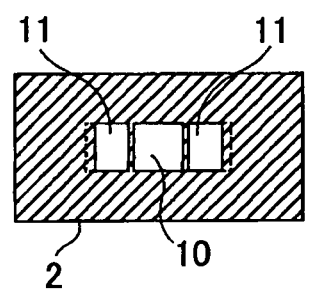

FIGS. 22A-22C illustrate an example where a dispersed phase is introduced into the fluid introduction flow passage 10 that is a first flow passage, continuous phases are introduced into the fluid introduction flow passages 11 that are second and third flow passages, and the protruding/depressed structures are arranged in the depth direction. FIGS. 23A-23C illustrate an example where a dispersed phase is introduced into the fluid introduction flow passage 10, continuous phases are introduced into the fluid introduction flow passages 11, and the protruding/depressed structures are arranged in the width direction. The outlet shape where the flow passage of the dispersed phase and the flow passages of the continuous phases merge is important in both cases shown in FIGS. 22A-22C and 23A-23C. Specifically, the ratio of the outlet shape in the depth direction and in the width direction is important.

Simulations were conducted to study differences in liquid droplet formation depending on this ratio (aspect ratio). The simulations were performed by using thermal-liquid analysis software called FLUENT.

Examples of results of the simulations are shown in FIGS. 24-27. In the examples shown in FIGS. 24, 25, the protruding/depressed structures shown in FIG. 22B are arranged in the depth direction. The aspect ratio is 1.5 in the example shown in FIG. 24, and the aspect ratio is 0.5 in the example shown in FIG. 25.

Figure 26:
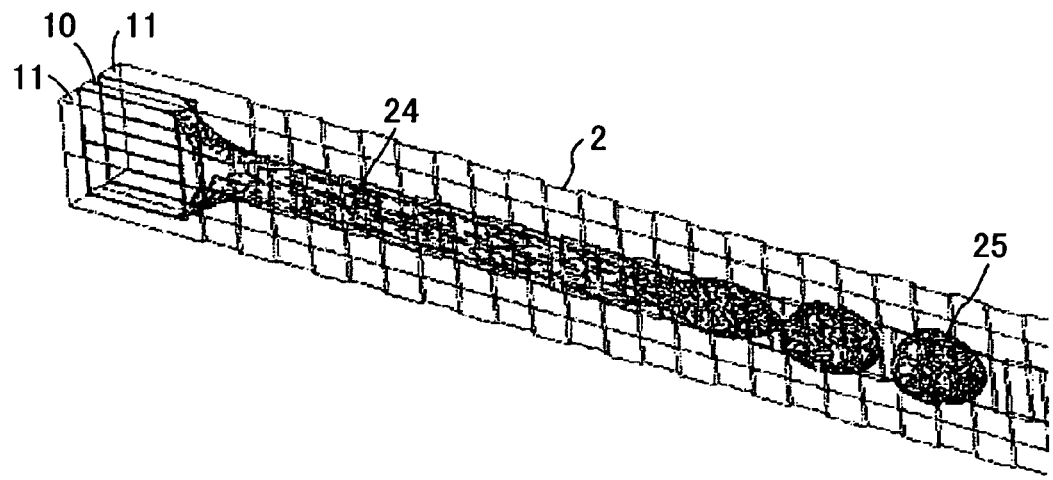
FIG. 26 illustrates simulation results of a liquid droplet forming operation in a structure with protruding/depressed structures arranged in the width direction and when the aspect ratio is 4.
Figure 27:
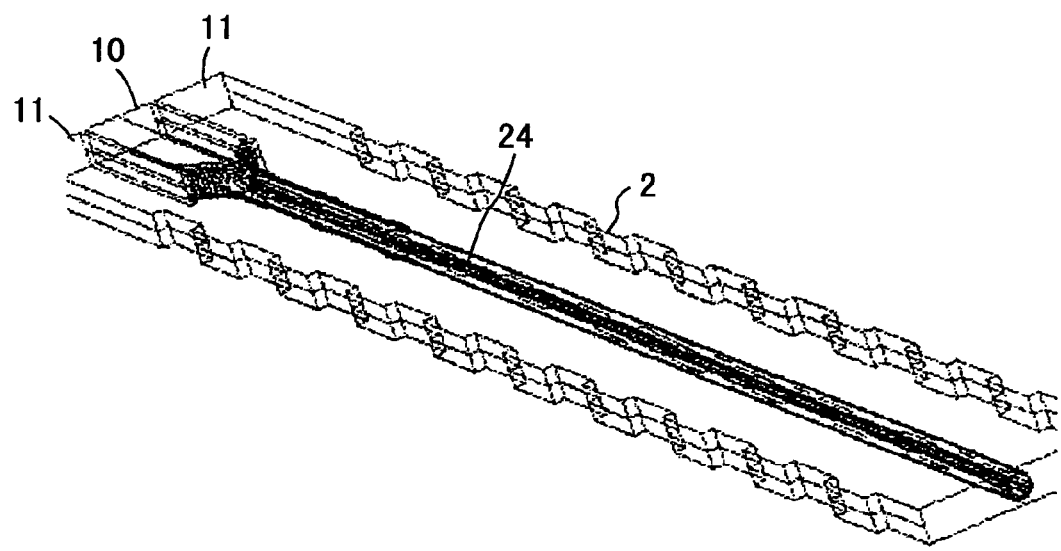
FIG. 27 illustrates simulation results of a liquid droplet forming operation in a structure with protruding/depressed structures arranged in the width direction and when the aspect ratio is 0.5.

In the examples shown in FIGS. 26, 27, the protruding/depressed structures shown in FIG. 23B are arranged in the width direction. The aspect ratio is 4 in the example shown in FIG. 26, and the aspect ratio is 0.5 in the example shown in FIG. 27.

Figure 24:
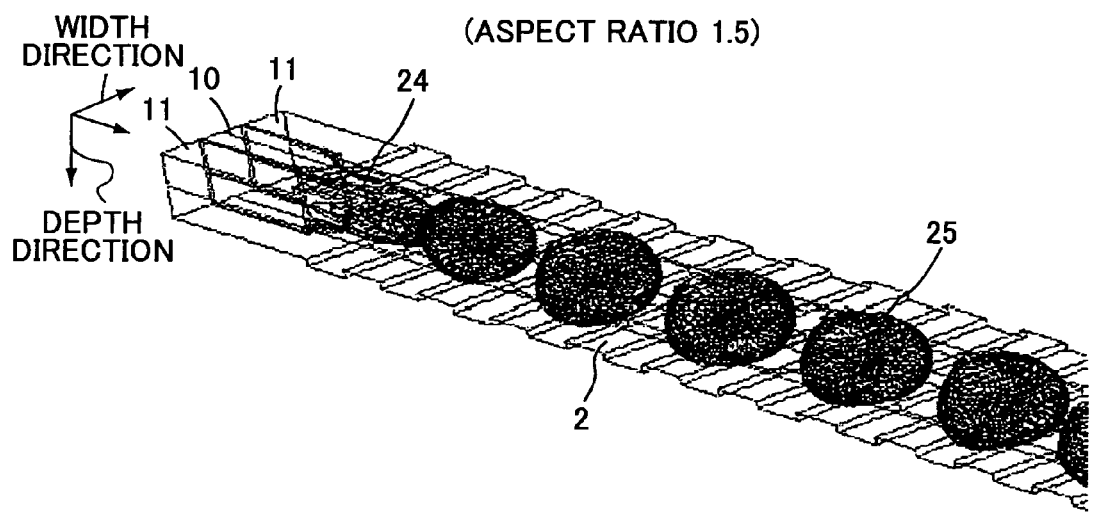
FIG. 24 illustrates simulation results of a liquid droplet forming operation in a structure with protruding/depressed structures arranged in the depth direction and when the aspect ratio is 1.5.
Figure 25:
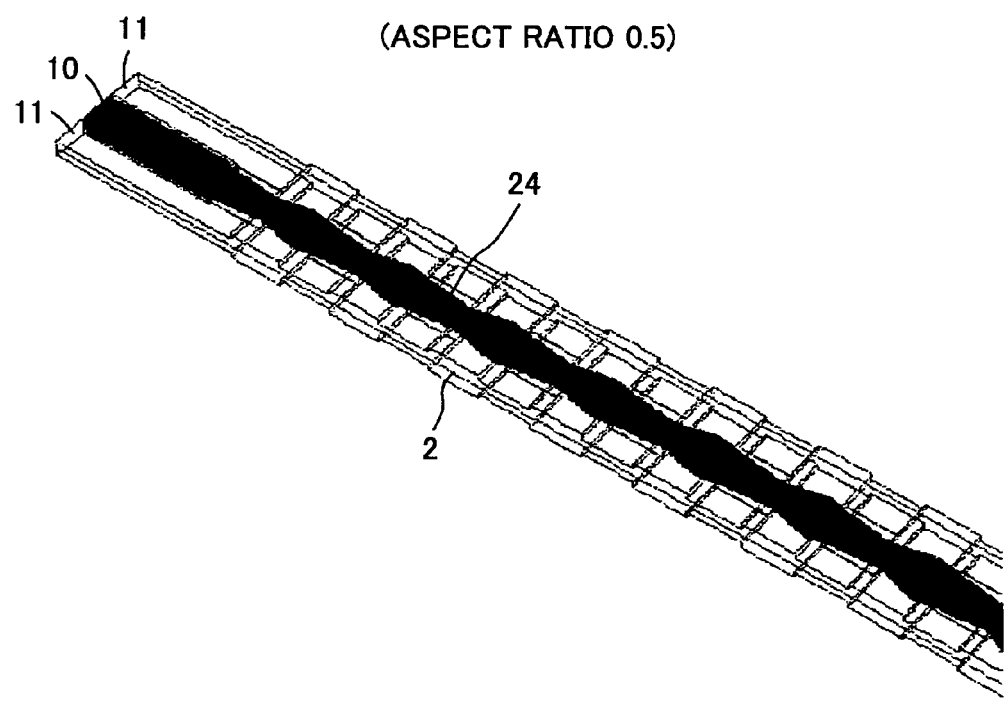
FIG. 25 illustrates simulation results of a liquid droplet forming operation in a structure with protruding/depressed structures arranged in the depth direction and when the aspect ratio is 0.5.

As shown in FIGS. 25, 27, when the aspect ratio is 0.5, the liquid droplets 25 are not formed. As shown in FIGS. 24, 26, when the aspect ratio is large enough, the liquid droplets 25 are formed.

Results of the simulations say that liquid droplets are formed when the aspect ratio is large. The reason is described with reference to the models shown in FIG. 24, 25.

Figure 28A:
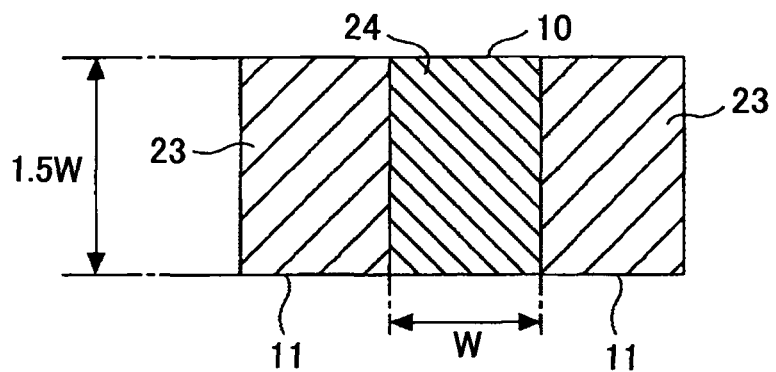
FIGS. 28A, 28B are schematic diagrams of a merging operation of fluids in the configuration shown in FIG. 24.
Figure 28B:
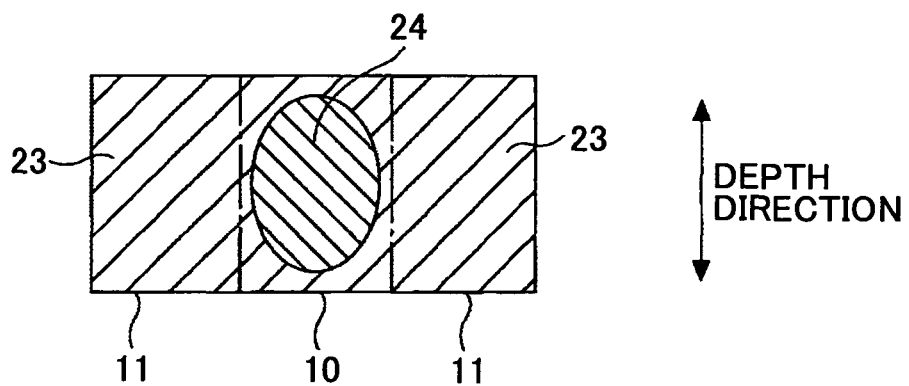

As shown in FIG. 28A, in the fluid introduction flow passage 10, the cross-sectional shape of the dispersed phase 24 is the same as the flow passage. However, as shown in FIG. 28B, when the dispersed phase 24 merges with the continuous phase 23, a layered flow is formed. Accordingly, the cross-sectional shape of the dispersed phase 24 becomes circular due to surface tension, and the dispersed phase 24 finally becomes a cylinder. In the example shown in FIG. 24, the cross-sectional shape of the dispersed phase 24 becomes vertically long, corresponding to a high aspect ratio, and gaps are formed at the top and the bottom in the depth00 direction. The continuous phase 23 enters these gaps.

In the example shown in FIG. 25, the cross-sectional shape of the dispersed phase 24 becomes horizontally long, corresponding to a low aspect ratio, and gaps are not formed at the top and the bottom in the depth direction. Accordingly, there are no spaces for the continuous phase 23 to enter.

Figure 29A:
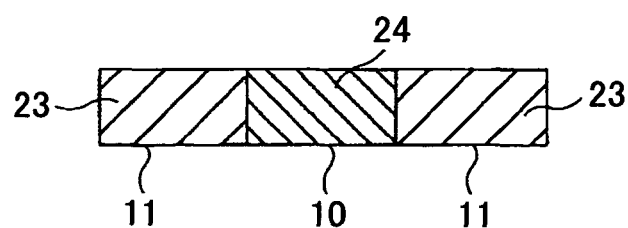
FIGS. 29A, 29B are schematic diagrams of a merging operation of fluids in the configuration shown in FIG. 25.
Figure 29B:
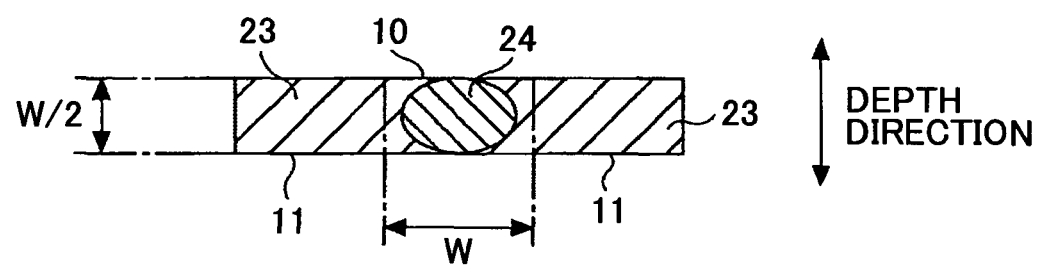

In the example shown in FIG. 24, the dispersed phase 24 is covered by the continuous phase 23 as shown in FIG. 28B. In the example shown in FIG. 25, the dispersed phase 24 is not totally covered by the continuous phase 23 as shown in FIG. 29B. The dispersed phase 24 needs to be totally covered by the continuous phase 23 in order to form liquid droplets.

The same relationship as described above applies to the examples shown in FIGS. 26, 27.

It is important to determine the level of the aspect ratio necessary for forming liquid droplets. Simulations were performed to find relationships between aspect ratios and formation of liquid droplets. Results are shown in Tables 1, 2. Table 1 includes results for a case where the protruding/depressed structures are provided in the width direction. Table 2 includes results for a case where the protruding/depressed structures are provided in the depth direction. Both tables indicate whether liquid droplets were formed under different aspect ratios and viscosities of the continuous phase.

TABLE 1

Formation of liquid droplets with protruding/depressed structures provided in width direction

| | | Viscosity of continuous phase (cSt) | | | |
|---|---|---|---|---|---|
| | | 1 | 1.5 | 2 | 10 |
| Aspect ratio | 0.1 | | | | X |
| | 1 | X | ○ | ○ | ○ |
| | 1.5 | ○ | | | |
| | 2 | ○ | | | |
| | 4 | | | | ○ | note:
blank cells: not calculated

TABLE 2

Formation of liquid droplets with protruding/depressed structures provided in depth direction

| | | Viscosity of continuous phase (cSt) | | | |
|---|---|---|---|---|---|
| | | 1 | 1.5 | 2 | 10 |
| Aspect ratio | 0.1 | X | X | | |
| | 1 | ○ | ○ | | |
| | 1.5 | ○ | | | |
| | 2 | | | | |
| | 4 | | | | | note:
blank cells: not calculated

A description is given below of the case of Table 1 in which protruding/depressed structures are provided in the width direction. The results of Table 1 say that liquid droplets are not formed when the aspect ratio is 0.5. Further, when the aspect ratio is one, liquid droplets are formed more successfully as the viscosity of the continuous phase increases. The viscosity of the continuous phase never falls below the viscosity of water (1 cSt).

Surfactant, etc., is mixed with water or a liquid similar to water in order to facilitate the formation of liquid droplets, and therefore, the viscosity often becomes high. When the viscosity becomes high, the liquid does not flow well in the flow passage. Accordingly, an appropriate viscosity of the continuous phase is in a range of 1 cSt-10 cSt in the simulation. When the aspect ratio is larger than one, liquid droplets can be formed regardless of the viscosity of the continuous phase.

A description is given below of the case of Table 2 in which protruding/depressed structures are provided in the depth direction. Based on the results shown in Table 1, it can be estimated that when the aspect ratio is 0.5 and the viscosity of the continuous phase is high, liquid droplets cannot be formed. When the aspect ratio is larger than one, it can be estimated that liquid droplets can be formed regardless of the viscosity of the continuous phase.

The relationship between the aspect ratio and the viscosity of the continuous phase is indicated in the tables. In addition, simulations were performed to study the relationship between the aspect ratio and the viscosity of the dispersed phase and the relationship between flow speeds of the dispersed phase and the continuous phase. It has been confirmed that the viscosity of the continuous phase slightly affects formation of liquid droplets when the protruding/depressed structures are provided in the width direction, but the viscosity of the dispersed phase and the flow speeds of the dispersed phase and the continuous phase do not affect formation of liquid droplets.

When actually forming liquid droplets, water is not used as the continuous phase. Surfactant is dissolved in water or a liquid other than water is used as the continuous phase, and therefore, the viscosity is higher than 1 cSt. Accordingly, whether the protruding/depressed structures are formed in the width direction or the depth direction, liquid droplets are formed as long as the aspect ratio is larger than one.

Due to the above reasons, the aspect ratio may be larger than one (ninth embodiment).

With regard to the maximum aspect ratio, the aspect ratio is preferably as large as possible, so that gaps are formed at the top and the bottom in the depth direction into which the continuous phase can enter. In reality, it is difficult to fabricate a flow passage having a high aspect ratio, so the maximum aspect ratio corresponds to the largest possible aspect ratio that can actually be manufactured.

Working Example 1

Working example 1 employed a PYREX® glass plate with flow passages formed by etching and a single protruding structure having a substantially rectangular wave shape (see FIGS. 4A-4C) to form liquid droplets. The cross-sectional shape of the dispersed phase at the introduction inlet was 20 µm in the width direction and 40 µm in the depth direction. The protruding structure was 4.9 µm in height and 8.2 µm in width. The merging part of the continuous phase and the dispersed phase was 100 µm in width and 40 µm in depth.

A liquid obtained by dispersing a pigment in ISOPAR G® (Exxon Mobil Corporation) was used as the dispersed phase. A liquid including 2% gelatin dissolved in ion-exchange water was used as the continuous phase. These were the compositions of the dispersed phase and the continuous phase of the working examples and comparative example described herein. Pressure applied to the dispersed phase fluid was 150 kPa. Pressure applied to the continuous phase fluid was 320 kPa. After granulation was continued for five hours, the liquid droplets obtained had an average diameter of 48.0 µm, a dispersion value of 8.2%, and the yield was 21 g.

Working Example 2

Figure 18A:
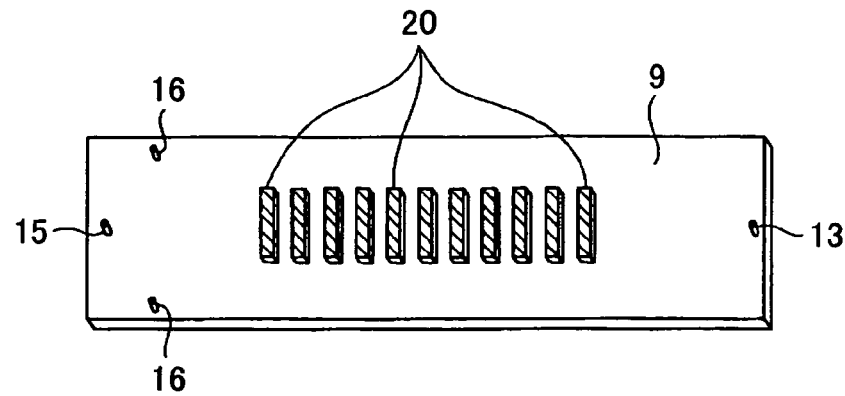
FIGS. 18A-18C are detailed diagrams of a microscopic flow passage structure according to a sixth embodiment of the present invention.
Figure 18B:
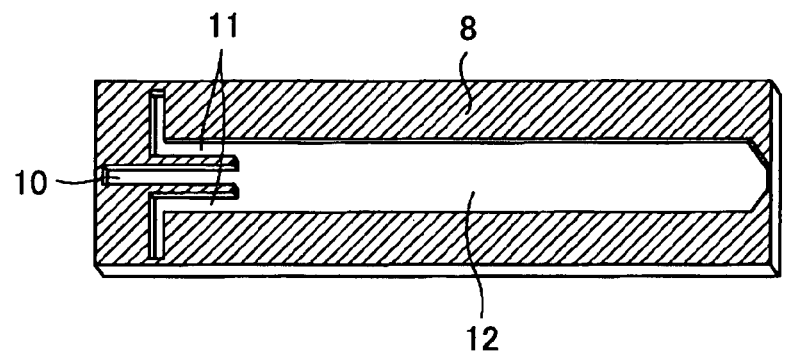
Figure 18C:
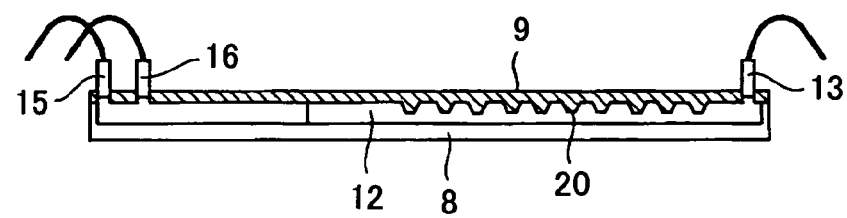

Working example 2 employed a PYREX® glass plate with flow passages formed by etching and a cyclic structure having substantially rectangular wave shapes (see FIGS. 18A-18C; sixth embodiment) to form liquid droplets. The cross-sectional shape of the dispersed phase at the introduction inlet was 20 µm in the width direction and 40 µm in the depth direction. The cyclic structure had a cycle of 100 µm. The merging part of the continuous phase and the dispersed phase was 100 µm in width and 40 µm in depth.

Pressure applied to the dispersed phase fluid was 150 kPa. Pressure applied to the continuous phase fluid was 320 kPa. After granulation was continued for five hours, the liquid droplets obtained had an average diameter of 48.0 µm, a dispersion value of 1.2%, and the yield was 25 g.

Working Example 3

Working example 3 employed a PYREX® glass plate with flow passages formed by etching and a cyclic structure having substantially rectangular wave shapes (see FIGS. 6A-6C) to form liquid droplets. The cross-sectional shape of the dispersed phase at the introduction inlet was 20 µm in the width direction and 40 µm in the depth direction. The cyclic structure had a cycle of 100 µm. The merging part of the continuous phase and the dispersed phase was 100 µm in width and 40 µm in depth.

Pressure applied to the dispersed phase fluid was 150 kPa. Pressure applied to the continuous phase fluid was 320 kPa. After granulation was continued for five hours, the liquid droplets obtained had an average diameter of 45.0 µm, a dispersion value of 1.8%, and the yield was 142 g.

Working Example 4

Working example 4 employed ten PYREX® glass plates arranged in parallel (see FIG. 17) to form liquid droplets, each plate having flow passages formed by etching and a cyclic structure having substantially rectangular wave shapes (see FIGS. 6A-6C). The cross-sectional shape of the dispersed phase at the introduction inlet was 20 µm in the width direction and 40 µm in the depth direction. The cyclic structure had a cycle of 100 µm. The merging part of the continuous phase and the dispersed phase was 100 µm in width and 40 µm in depth.

Pressure applied to the dispersed phase fluid was 250 kPa. Pressure applied to the continuous phase fluid was 480 kPa. After granulation was continued for five hours, the liquid droplets obtained had an average diameter of 52.0 µm, a dispersion value of 4.8%, and the yield was 512 g.

Working Example 5

Figure 19A:
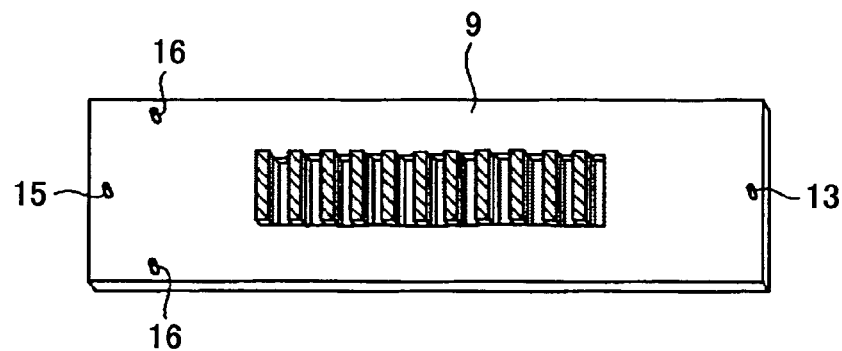
FIGS. 19A-19C are detailed diagrams of a microscopic flow passage structure according to a seventh embodiment of the present invention.
Figure 19B:
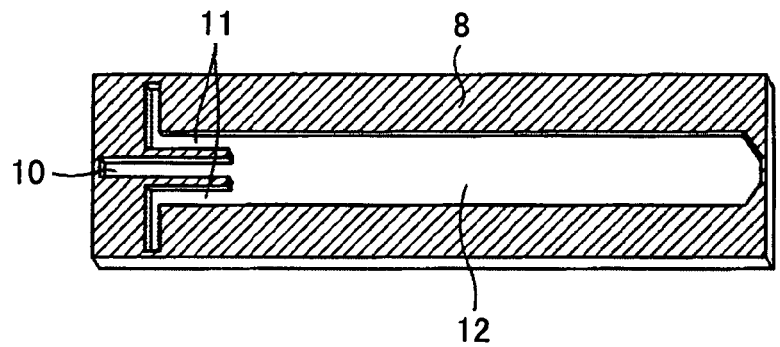
Figure 19C:
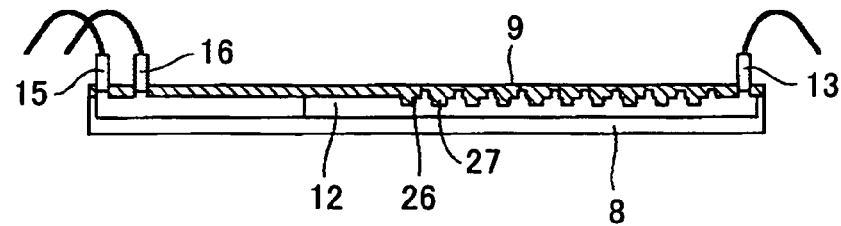

Working example 5 employed a PYREX® glass plate with flow passages formed by etching and a cyclic structure having substantially rectangular wave shapes (see FIGS. 19A-19C; seventh embodiment) to form liquid droplets. The cross-sectional shape of the dispersed phase at the introduction inlet was 20 µm in the width direction and 40 µm in the depth direction. The cyclic structure had a cycle of 100 µm. The merging part of the continuous phase and the dispersed phase was 100 µm in width and 40 µm in depth. The depressed parts were 5.0 µm in depth and 12 µm in length. The protruding parts were 8.0 µm in height and 88 µm in length.

Pressure applied to the dispersed phase fluid was 110 kPa. Pressure applied to the continuous phase fluid was 300 kPa. After granulation was continued for five hours, the liquid droplets obtained had an average diameter of 42.0 µm, a dispersion value of 0.5%, and the yield was 20 g.

Comparative Example 1

Y-Shaped Flow Passage

Figure 21:
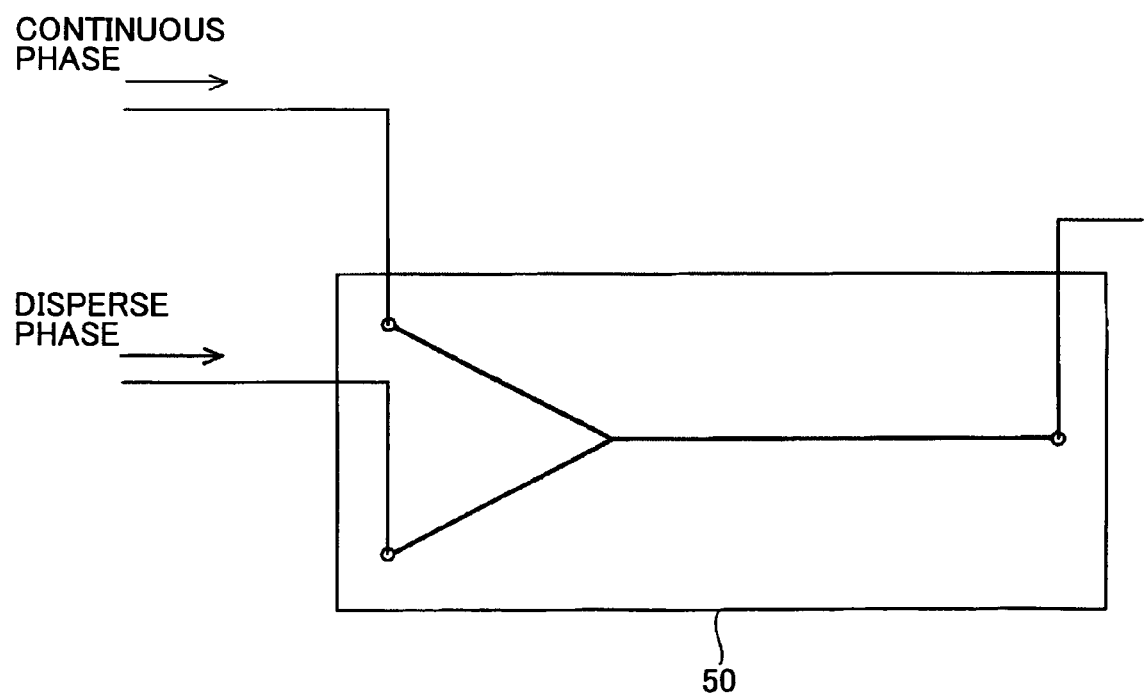
FIG. 21 is a schematic diagram of a microscopic liquid droplet generating system including a Y-type flow passage according to a comparative example.

Comparative example 1 employed a PYREX® glass plate with flow passages formed by etching and a Y-shaped flow passage structure 50 (see FIG. 21) to form liquid droplets. The cross-sectional area of the dispersed phase at the introduction inlet had a circle-equivalent diameter of 60 µm. The merging part of the continuous phase and the dispersed phase was 100 µm in width and 40 µm in depth.

Pressure applied to the dispersed phase fluid was 100 kPa. Pressure applied to the continuous phase fluid was 120 kPa. After granulation was continued for five hours, the liquid droplets obtained had an average diameter of 74.0 µm, a dispersion value of 1.5%, and the yield was 0.6 g.

Table 3 includes particle diameters, dispersion values, yield, etc., of the liquid droplets obtained in working examples 1-5 and comparative example 1.

TABLE 3

|  | Particle diameter [μm] | Dispersion value [%] | Yield [g] | No. of liquid columns [dispersed phase] | Cycle/shape of protruding/depressed structure |
|---|---|---|---|---|---|
| Working example 1 | 48 | 8.2 | 21 | single | single protruding: rectangular wave |
| Working example 2 | 48 | 1.2 | 25 | single | cyclic: rectangular wave |
| Working example 3 | 45 | 1.8 | 142 | plural | cyclic: rectangular wave |
| Working example 4 | 52 | 4.8 | 512 | plural | cyclic: rectangular wave (parallel flow passage structures) |
| Working example 5 | 42 | 0.5 | 20 | single | cyclic: substantially rectangular wave, combination |
| Comparative example 1 | 74 | 1.5 | 0.6 | single | none |

The following can be understood from the results shown in Table 3.

(1) Particle diameters (microscopic liquid droplet diameters) can be made smaller when a protruding/depressed structure, which induces a disturbance at the interface of the fluids, is provided (working examples 1-5), compared to when a protruding/depressed structure is not provided (comparative example 1).

(2) Dispersion values are smaller and particle diameters are more uniform when a cyclic protruding/depressed structure is provided, compared to when the protruding/depressed structure is provided singularly (working example 1).

(3) Particle diameters are even more uniform when different substantially rectangular wave-shaped parts are provided in combination in the cyclic structure (working example 5).

(4) Yield (productivity) is higher when a protruding/depressed structure, which induces a disturbance at the interface of the fluids, is provided (working examples 1-5), compared to when a protruding/depressed structure is not provided (comparative example 1).

(5) By providing a cyclic structure and increasing the number of liquid columns, a larger yield of liquid droplets having small and highly uniform diameters can be obtained (large-scale production).

Working Example 6

Micro-Capsulation

The particles formed in working example 5 were micro-capsulated by forming films by the above-described coacervation method. The particle diameter of the microcapsules was 42 μm, and the dispersion value was 1.5%. By applying these microcapsules on a film substrate, a highly dense capsule film having a filling structure was formed.

In the above embodiments, the protruding/depressed structure is permanently provided on the walls of the merged flow passage 12. However, the protruding/depressed structure can appear only when necessary. For example, the flow passage structure can be made of a rubber material, the walls of the merged flow passage 12 can have portions of different hardness levels with intervals therebetween in the flow direction of the fluid, and the portions with low hardness levels can be depressed due to pressure of the fluid. The protruding/depressed cyclic structure can be realized in this manner.

Figure 20:
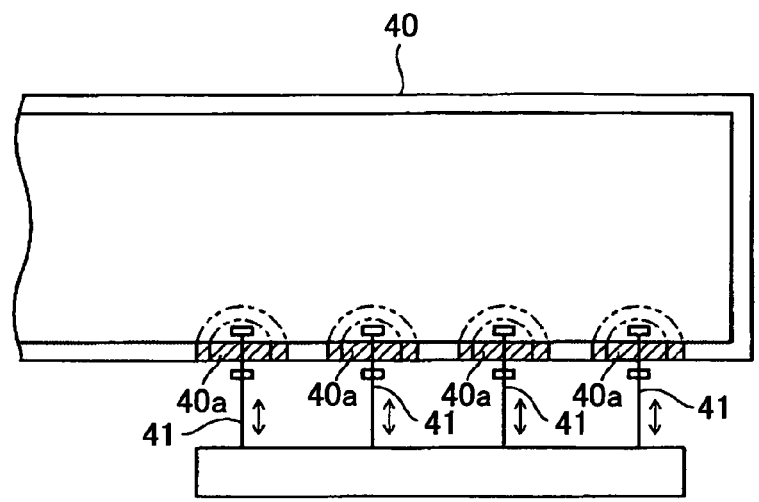
FIG. 20 is a plan view of relevant parts of a microscopic flow passage structure according to an eighth embodiment of the present invention.

In an eighth embodiment shown in FIG. 20, soft parts 40a having low hardness levels are provided along a wall of a flow passage structure 40, and movable rods 41 for controlling the soft parts 40a can press the soft parts 40a to depress the wall inward.

By adjusting the strokes of the movable rods 41, the depths of the protruding/depressed structure can be finely controlled.

According to one embodiment of the present invention, it is possible to induce formation of liquid droplets with a simple structure without using a piezoelectric element to apply mechanical oscillations. Accordingly, liquid droplets with uniform diameters can be generated.

Further, according to one embodiment of the present invention, monodispersive liquid droplets can be stably generated from all flow passages.

Further, according to one embodiment of the present invention, liquid droplets can be stably and continuously generated at a high-speed cycle.

Further, according to one embodiment of the present invention, satellites are prevented from being generated.

Further, according to one embodiment of the present invention, microcapsules with uniform particle diameters can be generated. By using these microcapsules as cataphoresis type display devices, quality of the reproduced image is enhanced.

Further, according to one embodiment of the present invention, when microscopic particles obtained by solidifying the liquid droplets are used as display particles such as toner, highly precise image quality can be achieved.

The present invention is not limited to the specifically disclosed embodiment, and variations and modifications may be made without departing from the scope of the present invention.

The present application is based on Japanese Priority Patent Application No. 2006-134231, filed on May 12, 2006, the entire contents of which are hereby incorporated by reference.

What is claimed is:

1. A microscopic flow passage structure for generating microscopic liquid droplets, the microscopic flow passage structure comprising:

first fluid introduction flow passages containing a fluid of a dispersed phase for forming the microscopic liquid droplets;

second fluid introduction flow passages containing a fluid of a continuous phase for dispersing the liquid droplets, and wherein the fluid of the continuous phase is incompatible with the fluid of the dispersed phase, and wherein the fluid of the continuous phase and the fluid of the dispersed phase have a solubility of less than 10% with respect to each other;

a merged flow passage in which the fluid of the dispersed phase and the fluid of the continuous phase merge, and wherein the first and second fluid introduction flow passages are configured to separately introduce the fluid of the dispersed phase and the fluid of the continuous phase to the merged flow passage; and a common outlet through which the fluids can be discharged from the merged flow passage; and wherein the merged flow passage includes a region in which a cross-sectional area of the merged flow passage changes cyclically in a fluid flow direction, and the merged flow passage allows only a fixed flow quantity of the fluids to pass through a single merged flow passage, such that a velocity of the fluids changes according to a portion of the fluids in the single merged flow passage; and wherein the single merged flow passage has a common cyclically changing cross-sectional area, and wherein all of the fluids flow through the common cyclically changing cross-sectional area of the single merged flow passage.

2. The microscopic flow passage structure according to claim 1, wherein at least one of the first fluid introduction flow passages includes an outlet having a cross-sectional shape with a length in a depth direction and a length in a width direction, the width direction being a direction in which the first fluid introduction flow passages are arranged and the depth direction being a direction orthogonal to the width direction, and a value of "the length in the depth direction/the length in the width direction" is one or more.

3. The microscopic flow passage structure according to claim 2, wherein either a length in the depth direction or a length in the width direction of the cross-sectional area of the said region changes.

4. The microscopic flow passage structure according to claim 1, wherein the first and second fluid introduction flow passages are arranged in such a manner that two or more different types of the fluids are arranged alternately in parallel in a direction orthogonal to the fluid flow direction.

5. The microscopic flow passage structure according to claim 4, wherein among the fluids in the single merged flow passage, fluids in contact with walls of the single merged flow passage are continuous phases.

6. The microscopic flow passage structure according to claim 1, wherein the said region includes a cyclic protruding/depressed structure.

7. The microscopic flow passage structure according to claim 6, wherein the cyclic protruding/depressed structure has a rectangular wave shape or a rectangular-like wave shape.

8. The microscopic flow passage structure according to claim 6, wherein the cyclic protruding/depressed structure has a shape that is a combination of different rectangular wave shapes or rectangular-like wave shapes.

9. The microscopic flow passage structure according to claim 6, wherein walls of the merged flow passage include portions of different hardness levels with intervals therebetween in the fluid flow direction, and the cyclic protruding/depressed structure appears when portions of low hardness levels are depressed by pressure of the fluids.

10. The microscopic flow passage structure according to claim 1, wherein a cyclic wavelength of the said region is 3.0-10.0 times a circle-equivalent diameter of a fluid to be turned into the liquid droplets immediately before the fluids merge.

11. A microscopic liquid droplet generating system comprising:

a microscopic flow passage structure;

a fluid of a dispersed phase for forming microscopic liquid droplets; and a fluid of a continuous phase for dispersing the liquid droplets, and wherein the fluid of the continuous phase is incompatible with the fluid of the dispersed phase, and wherein the fluid of the continuous phase and the fluid of the dispersed phase have a solubility of less than 10% with respect to each other; and wherein the microscopic flow passage structure includes:

a first microscopic fluid introduction flow passage containing the fluid of the dispersed phase;

a second microscopic fluid introduction flow passage containing the fluid of the continuous phase;

a merged flow passage in which the fluid of the dispersed phase and the fluid of the continuous phase merge, and wherein the first and second microscopic fluid introduction flow passages are configured to separately introduce the fluid of the dispersed phase and the fluid of the continuous phase to the merged flow passage; and a common outlet through which the fluids can be discharged from the merged flow passage; and wherein the merged flow passage includes a region in which a cross-sectional area of the merged flow passage changes cyclically in a fluid flow direction, and the merged flow passage allows only a fixed flow quantity of the fluids to pass through a single merged flow passage, such that a velocity of the fluids changes according to a position of the fluids in the single merged flow passage; and wherein the single merged flow passage has a common cyclically changing cross-sectional area, and wherein all of the fluids flow through the common cyclically changing cross-sectional area of the single merged flow passage.

12. The microscopic liquid droplet generating system according to claim 11, further comprising: a unit configured to form a film on each of the liquid droplets generated by the microscopic flow passage structure.

* * * * *